US012586095B2

(12) United States Patent
Perez et al.

(10) Patent No.: US 12,586,095 B2
(45) Date of Patent: *Mar. 24, 2026

(54) METHODS AND APPARATUS TO ANALYZE AND ADJUST DEMOGRAPHIC INFORMATION

(71) Applicant: The Nielsen Company (US), LLC, New York, NY (US)

(72) Inventors: Albert R. Perez, San Francisco, CA (US); Josh Gaunt, Sunnyvale, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/010,535

(22) Filed: Jan. 6, 2025

(65) Prior Publication Data

US 2025/0139650 A1 May 1, 2025

Related U.S. Application Data

(63) Continuation of application No. 18/526,009, filed on Dec. 1, 2023, now Pat. No. 12,223,520, which is a
(Continued)

(51) Int. Cl.
*G06Q 30/0204* (2023.01)
*G06Q 10/067* (2023.01)
(Continued)

(52) U.S. Cl.
CPC ....... *G06Q 30/0204* (2013.01); *G06Q 10/067* (2013.01); *G06Q 30/0201* (2013.01); *G06Q 30/0246* (2013.01)

(58) Field of Classification Search
None
See application file for complete search history.

(56) References Cited

U.S. PATENT DOCUMENTS 7,306,913 B2 * 12/2007 Devlin ................. C12Q 1/6883
536/23.1
7,702,555 B1 * 4/2010 Breeden ................. G06Q 40/00
705/36 R (Continued)

OTHER PUBLICATIONS

Spatial Regression Models for Demographic Analysis (Year: 2008).*
Demographic Prediction Based on User's Browsing Behavior (Year: 2007).*

*Primary Examiner* — Kim T Nguyen

(57) ABSTRACT

A disclosed example includes accessing computer-generated impression records, the computer-generated impression records based on network communications received at a server of a database proprietor from client devices, the computer-generated impression records indicative of accesses to media at the client devices; accessing self-reported demographic data and behavioral data from a database of the database proprietor, the self-reported demographic data and the behavioral data corresponding to user accounts registered with the database proprietor and associated with the client devices; comparing the self-reported demographic data with a probability distribution of higher-accuracy demographic data; determining different adjustments for corresponding ones of self-reported demographics of the self-reported demographic data based on the comparison; adjusting the corresponding ones of the self-reported demographics based on corresponding ones of the different adjustments to generate adjusted user demographic data; and assigning the adjusted user demographic data to corresponding ones of the computer-generated impression records.

20 Claims, 15 Drawing Sheets

Related U.S. Application Data continuation of application No. 18/147,513, filed on Dec. 28, 2022, now Pat. No. 11,869,024, which is a continuation of application No. 17/163,533, filed on Jan. 31, 2021, now Pat. No. 11,551,246, which is a continuation of application No. 16/051,055, filed on Jul. 31, 2018, now Pat. No. 10,909,559, which is a continuation of application No. 15/420,861, filed on Jan. 31, 2017, now Pat. No. 10,096,035, which is a continuation of application No. 14/809,888, filed on Jul. 27, 2015, now Pat. No. 9,582,809, which is a continuation of application No. 13/209,292, filed on Aug. 12, 2011, now Pat. No. 9,092,797.

(60) Provisional application No. 61/386,543, filed on Sep. 26, 2010, provisional application No. 61/385,553, filed on Sep. 22, 2010.

(51) Int. Cl.
  *G06Q 30/0201* (2023.01)
  *G06Q 30/0242* (2023.01)

(56) References Cited

U.S. PATENT DOCUMENTS

| | | | | |
|---|---|---|---|---|
| 7,711,155 | B1 * | 5/2010 | Sharma | G06V 10/754 |
| | | | | 345/422 |
| 11,869,024 | B2 * | 1/2024 | Perez | G06Q 30/0204 |
| 12,008,587 | B2 * | 6/2024 | Cui | G06V 10/764 |
| 12,450,620 | B2 * | 10/2025 | Cui | G06V 10/764 |
| 2004/0166519 | A1 * | 8/2004 | Cargill | C12Q 1/6883 |
| | | | | 536/23.2 |
| 2008/0108081 | A1 * | 5/2008 | Luke | C12Q 1/6883 |
| | | | | 435/6.11 |
| 2010/0125416 | A1 * | 5/2010 | Harris | G01N 33/92 |
| | | | | 702/19 |
| 2023/0132878 | A1 * | 5/2023 | Perez | G06Q 30/0204 |
| | | | | 705/7.33 |
| 2023/0319332 | A1 * | 10/2023 | Sullivan | G06N 5/01 |
| 2024/0095765 | A1 * | 3/2024 | Perez | G06Q 30/0204 |
| 2024/0144323 | A1 * | 5/2024 | Tucker | G06Q 30/0204 |
| 2024/0249157 | A1 * | 7/2024 | Stojkovic | G06N 20/00 |
| 2024/0303676 | A1 * | 9/2024 | Cui | G06Q 30/0201 |
| 2025/0139650 | A1 * | 5/2025 | Perez | G06Q 10/067 |
| 2025/0242120 | A1 * | 7/2025 | Mansfield | A61M 16/0003 |

* cited by examiner

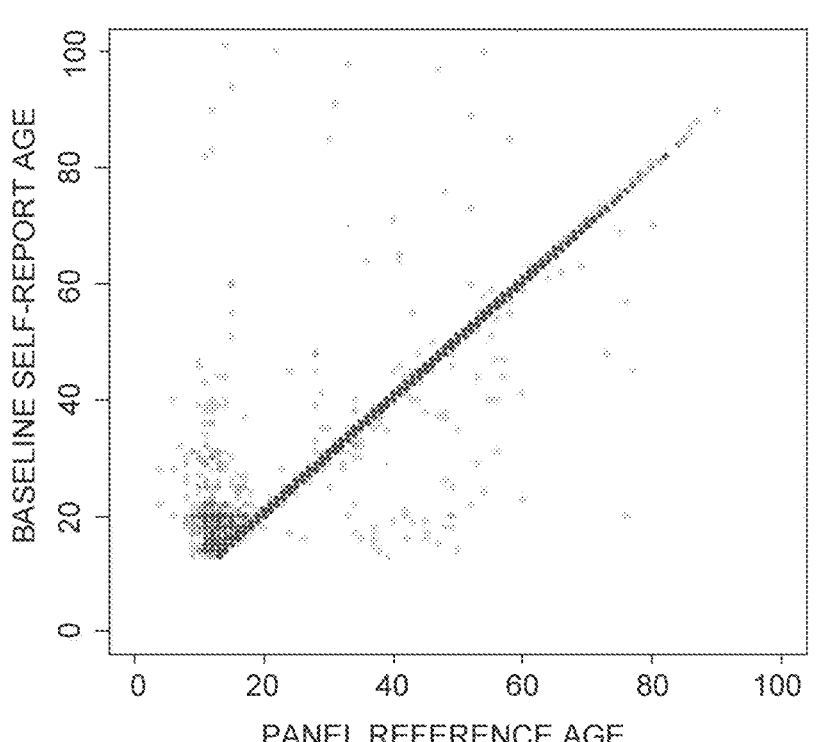
FIG. 2

| Source | Name | Type | Meaning |
|---|---|---|---|
| DB PROPRIETOR | userid | string | hashed userid |
| DB PROPRIETOR | deactivated | boolean | 1 = user is deactivated |
| DB PROPRIETOR | hsyear | Int | year of hs graduation |
| DB PROPRIETOR | political | boolean | 1 = has entered info about political preference |
| DB PROPRIETOR | contactemailconfirmed | boolean | 1 = has confirmed their contact email |
| DB PROPRIETOR | current_address_present | boolean | 1 = has listed their physical address |
| DB PROPRIETOR | self_report_zip | Int | self reported zip code |
| DB PROPRIETOR | asprofilepicturepresent | boolean | 1 = has a profile pic uploaded |
| DB PROPRIETOR | screenname_present | boolean | 1 = has entered a screen name |
| DB PROPRIETOR | mobilephone_present | boolean | 1 = has entered a mobile phone number |
| DB PROPRIETOR | birthdayprivacy | int | 1 = MDY, 2=MD, 3=NONE, missing = not set |
| DB PROPRIETOR | relationshipstatus | int | 0 = none, >0 = something set |
| DB PROPRIETOR | friend_count | int | number of friends |
| DB PROPRIETOR | age | int | self reported age |
| DB PROPRIETOR | gender | int | 0 = not reported, 1 = female, 2 = male, 3 = predicted male, 4 = predicted female |
| DB PROPRIETOR | account_age | int | days since registration |
| DB PROPRIETOR | ageatregistration | int | age at registration |
| DB PROPRIETOR | active30day | boolean | 1 = active 30 day |
| DB PROPRIETOR | active7day | boolean | 1 = active 7 day |
| DB PROPRIETOR | is_deactivated | boolean | 1 = is deactivated |
| DB PROPRIETOR | mobile_active7day | boolean | 1 = 7 day active on mobile |
| DB PROPRIETOR | web_active7day | boolean | 1 = 7 day active on web |
| DB PROPRIETOR | count_edu_entries | int | count of entries in edu fields |
| DB PROPRIETOR | count_family_tagged | int | count of entries in family fields |
| DB PROPRIETOR | countpageviews | int | count of page views over last week |

RAW DEMOGRAPHIC AND BEHAVIORAL VARIABLES TABLE

| Source | Name | Type | Meaning |
|--------|------|------|---------|
| DB PROPRIETOR | msg_send_count | int | count of messages sent over last week |
| DB PROPRIETOR | photo_add_count | int | count of photos added (may be photo albums in some circumstances) over last week |
| DB PROPRIETOR | wall_post_count | int | count of wall posts in last week |
| DB PROPRIETOR | mobilepageviews | int | count of mobile page views in last week |
| DB PROPRIETOR | webpageviews | int | count of webpage views in last week |
| DB PROPRIETOR | mobile_server_hits | int | count of mobile server hits in last week |
| DB PROPRIETOR | web_server_hits | int | count of web server hits in last week |
| DB PROPRIETOR | count_workplace_entries | int | count of entries in work fields |
| DB PROPRIETOR | dbp_user_cluster_1 | float | score for membership in user category 1 |
| DB PROPRIETOR | dbp_user_cluster_2 | float | score for membership in user category 2 |
| DB PROPRIETOR | dbp_user_cluster_3 | float | score for membership in user category 3 |
| DB PROPRIETOR | dbp_user_cluster_4 | float | score for membership in user category 4 |
| DB PROPRIETOR | dbp_user_cluster_5 | float | score for membership in user category 5 |
| DB PROPRIETOR | dbp_user_assigned_cluster | int | user category assignment |
| DB PROPRIETOR | reg_with_edu_email | boolean | 1 = registered with an .edu account |
| DB PROPRIETOR | using_edu_email | boolean | 1 = currently using an edu email account |
| DB PROPRIETOR | median_friends_hsyear_raw | float | 25th, 50th, and 75th percentiles in friends hs grad years |
| DB PROPRIETOR | median_friends_age_raw | float | 25th, 50th, and 75th percentiles in friends ages |
| DB PROPRIETOR | median_friends_regage_raw | float | 25th, 50th, and 75th percentiles in age friends registered at |
| DB PROPRIETOR | percent_female_friends | float | % of friends who are female |
| DB PROPRIETOR | category_parents | string | interest category of parents (null or yes) |
| DB PROPRIETOR | category_smb | string | interest category of small business owners (null or yes) |

RAW DEMOGRAPHIC AND BEHAVIORAL VARIABLES TABLE (CONTINUED)

| Source | Name | Type | Meaning |
|---|---|---|---|
| DB PROPRIETOR | category_highincome | string | interest category of high income (null or yes) |
| DB PROPRIETOR | category_casualgamers | string | interest category of casual gamers (null or yes) |
| DB PROPRIETOR | category_spritgambling | string | interest category in spirits or gambling (sum or NULL) |
| DB PROPRIETOR | category_sports | string | interest category in a sports field (sum or NULL) |
| DB PROPRIETOR | category_retirees | string | interest category of retirees (null or yes) |
| DB PROPRIETOR | dbp_city_name | string | predicted city |
| DB PROPRIETOR | dbp_region_name | string | predicted region |
| AME | c_user cookie value | string | hashed DB PROPRIETOR userid |
| AME | ame_cookie_classif_flag | boolean | 1 = cookie value matches demo info from panelist it was classified to |
| AME | ame_cookie_match_prompt | boolean | 1 = cookie value matches demo info from panelist prompted in session it came from |
| AME | ame_rn_id | string | unique AME user id: combination of meter_id (household) and member_id |
| AME | ame_age | int | age of AME panelist |
| AME | ame_gender | int | gender of AME panelist |
| AME | ame_total_num | int | number of cookie drops within time period |

RAW DEMOGRAPHIC AND BEHAVIORAL VARIABLES TABLE (CONTINUED)

FIG. 4C

400

| Source | Name | Type | Meaning |
|---|---|---|---|
| recode | dbp_hsyear_bln | Boolean | 1=entered year of hs graduation |
| recode | dbp_self_report_zip_bln | Boolean | 1=entered a zip code |
| recode | dbp_friend_count_iqr | Int | friend count expressed categorically as 1 of 4 quartiles |
| recode | dbp_friend_count_idr | Int | friend count expressed categorically as 1 of 10 deciles |
| recode | dbp_dbpage_iqr | Int | age of account expressed categorically as 1 of 4 quartiles |
| recode | dbp_dbpage_idr | Int | age of account expressed categorically as 1 of 10 deciles |
| recode | dbp_countpageviews_iqr | Int | count of pageviews expressed categorically as 1 of 4 quartiles |
| recode | dbp_countpageviews_idr | Int | count of pageviews expressed categorically as 1 of 10 deciles |
| recode | dbp_msg_sand_bln | Boolean | 1=sent message(s) within last week |
| recode | dbp_wall_post_bln | Boolean | 1=posted on wall(s) within past week |
| recode | dbp_mobilepageviews_bln | Boolean | 1=mobile page view(s) within past week |
| recode | dbp_webpageviews_iqr | Int | count of web pageviews expressed categorically as 1 of 4 quartiles |
| recode | dbp_webpageviews_idr | Int | count of web pageviews expressed categorically as 1 of 10 deciles |
| recode | dbp_mobile_server_hits_bln | Boolean | 1=mobile server hit(s) within past week |
| recode | dbp_web_server_hits_iqr | Int | count of web server hits expressed categorically as 1 of 4 quartiles |
| recode | dbp_web_server_hits_idr | Int | count of web server hits expressed categorically as 1 of 10 deciles |
| recode | dbp_user_cluster | Float | =1*user_cluster1 + 2*user_cluster2 + 3*user_cluster3 + 4*user_cluster4 + 5*user_cluster5 |

RECODED DEMOGRAPHIC AND BEHAVIORAL VARIABLES TABLE

| Source | Name | Type | Meaning |
|---|---|---|---|
| recode | dbp_median_friends_hsyear | Int | median year of friends' high school graduation |
| recode | dbp_median_friends_age | Float | median age of friends |
| recode | dbp_median_friends_regage | Float | median age of friends at account registration |
| recode | dbp_percent_female_friends_iqr | Float | % female friends expressed categorically as 1 of 4 quartiles |
| recode | dbp_percent_female_friends_idr | Float | % female friends expressed categorically as 1 of 10 deciles |
| added | key | Int | Index |
| added | for_model | Boolean | 1=include record in model dataset |
| added | cookie_dup | Int | count of duplicate cookie values |
| added | m_id_dup | Int | count of duplicate m_ids |
| added | rpt_agecat | String | AME age collapsed into buckets (see Table 700) |
| added | dbp_agecat | String | DB Proprietor age collapsed into buckets (see Table 700) |
| added | age_diff | Int | difference between AME and DB Proprietor ages |
| added | age_match | Boolean | 1=age_diff is zero |
| added | ame_gendercat | String | int to M/F for R to treat categorically |
| added | dbp_gendercat | String | int to M/F for R to treat categorically |
| added | gen_match | Boolean | 1=AME and DB Proprietor gender same |
| added | unspec | Boolean | 1=gender unspecified on DB Proprietor |
| added | perfect_match | Boolean | 1=age and gender match between AME and DB Proprietor |
| added | ame_genderage | String | AME gender and age combined into conjunction buckets |
| added | dbp_genderage | String | DB Proprietor gender and age combined into conjunction buckets |
| added | genderage_match | Boolean | 1=AME and DB Proprietor genderage same |

502  504  506

500    RECODED DEMOGRAPHIC AND BEHAVIORAL VARIABLES TABLE (CONTINUED)

FIG. 5B

| LABEL | AGE RANGE |
|-------|-----------|
| A | 2-11 |
| B | 12-14 |
| C | 15-17 |
| D | 18-20 |
| E | 21-24 |
| F | 25-29 |
| G | 30-34 |
| H | 35-39 |
| I | 40-44 |
| J | 45-49 |
| K | 50-54 |
| L | 55-64 |
| M | 65+ |

600

AME AGE CATEGORY TABLE

| T-NODE | A_PDF | B_PDF | C_PDF | D_PDF | E_PDF | F_PDF | G_PDF | H_PDF | I_PDF | J_PDF | K_PDF | L_PDF | M_PDF |
|---|---|---|---|---|---|---|---|---|---|---|---|---|---|
| 13 | 24.0% | 70.0% | 0.0% | 0.0% | 0.0% | 0.0% | 0.0% | 4.0% | 0.0% | 0.0% | 2.0% | 0.0% | 0.0% |
| 14 | 1.1% | 98.9% | 0.0% | 0.0% | 0.0% | 0.0% | 0.0% | 0.0% | 0.0% | 0.0% | 2.0% | 0.0% | 0.0% |
| 18 | 6.2% | 32.3% | 60.0% | 0.0% | 0.0% | 0.0% | 0.0% | 1.5% | 0.0% | 0.0% | 2.0% | 0.0% | 0.0% |

702a, 702b, 702c 704   706

| WTS.PROP | WTS.TRAIN | WTS.TEST | BUCKET | DBP_ACC | LEAFACC | OOSACC | LEAFMINUSOOS | Z | USEPDF | MOVED? |
|---|---|---|---|---|---|---|---|---|---|---|
| 1.0% | 50 | 6 | B | 70.0% | 70.0% | 66.7% | -3.3% | -0.07 | 1 | 15 |
| 1.7% | 88 | 16 | B | 98.9% | 98.9% | 100.0% | 1.1% | 0.20 | 0 | 0 |
| 1.3% | 65 | 17 | C | 60.0% | 60.0% | 58.8% | -1.2% | 0.06 | 1 | 26 |

710

| A | B | C | D | E | F | G | H | I | J | K | L | M |
|---|---|---|---|---|---|---|---|---|---|---|---|---|
| 24.0% | 70.0% | 0.0% | 0.0% | 0.0% | 0.0% | 0.0% | 4.0% | 0.0% | 0.0% | 2.0% | 0.0% | 0.0% |
| 0.0% | 100.0% | 0.0% | 0.0% | 0.0% | 0.0% | 0.0% | 0.0% | 0.0% | 0.0% | 0.0% | 0.0% | 0.0% |
| 6.2% | 32.3% | 60.0% | 0.0% | 0.0% | 0.0% | 0.0% | 1.5% | 0.0% | 0.0% | 0.0% | 0.0% | 0.0% |

| A | B | C | D | E | F | G | H | I | J | K | L | M |
|---|---|---|---|---|---|---|---|---|---|---|---|---|
| 12 | 35 | 0 | 0 | 0 | 0 | 0 | 2 | 0 | 0 | 1 | 0 | 0 |
| 0 | 88 | 0 | 0 | 0 | 0 | 0 | 0 | 0 | 0 | 0 | 0 | 0 |
| 4 | 21 | 39 | 0 | 0 | 0 | 0 | 1 | 0 | 0 | 0 | 0 | 0 |

700

TERMINAL NODE TABLE

FIG. 7

METHODS AND APPARATUS TO ANALYZE AND ADJUST DEMOGRAPHIC INFORMATION

CROSS REFERENCE TO RELATED APPLICATIONS

The present disclosure is a continuation of U.S. patent application Ser. No. 18/526,009, filed Dec. 1, 2023, now U.S. Pat. No. 12,223,520, which is a continuation of U.S. patent application Ser. No. 18/147,513, filed Dec. 28, 2022, now U.S. Pat. No. 11,869,024, which is a continuation of U.S. patent application Ser. No. 17/163,533, filed Jan. 31, 2021, now U.S. U.S. Pat. No. 11,551,246, which is a continuation of U.S. patent application Ser. No. 16/051,055, filed Jul. 31, 2018, now U.S. Pat. No. 10,909,559, which is a continuation of U.S. patent application Ser. No. 15/420, 861, filed Jan. 31, 2017, now U.S. Pat. No. 10,096,035, which is a continuation of U.S. patent application Ser. No. 14/809,888, filed on Jul. 27, 2015, now U.S. Pat. No. 9,582,809, which is a continuation of U.S. patent application Ser. No. 13/209,292, filed on Aug. 12, 2011, now U.S. Pat. No. 9,092,797, which claims priority to U.S. Provisional Patent Application No. 61/385,553, filed on Sep. 22, 2010, and U.S. Provisional Patent Application No. 61/386,543, filed on Sep. 26, 2010, all of which are hereby incorporated herein by reference in their entireties.

FIELD OF THE DISCLOSURE

The present disclosure relates generally to audience measurements and, more particularly, to methods and apparatus to analyze and adjust demographic information of audience members.

BACKGROUND

Traditionally, audience measurement entities determine audience compositions for media programming by monitoring on registered panel members and extrapolating their behavior onto a larger population of interest. That is, an audience measurement entity enrolls people that consent to being monitored into a panel and collects relatively highly accurate demographic information from those panel members via, for example, in-person, telephonic, and/or online interviews. The audience measurement entity then monitors those panel members to determine media programs (e.g., television programs or radio programs, movies, DVDs, online behavior, etc.) exposed to those panel members. In this manner, the audience measurement entity can identify demographic markets for which impressions or exposures to different media content occur.

BRIEF DESCRIPTION OF THE DRAWINGS

FIG. 2 illustrates an initial age scatter plot of baseline self-reported ages from a social media website prior to adjustment versus highly reliable panel reference ages.

FIGS. 4A-4C show a raw demographic and behavioral variables table to store variables indicative of different demographic and/or behavioral data collected for panelists of the audience measurement entity of FIG. 1 and/or registered users of a database proprietor of FIG. 1.

FIGS. 5A and 5B show a recoded demographic and behavioral variables table to store recoded variables indicative of different demographic and/or behavioral data collected for the panelists of the audience measurement entity of FIG. 1 and/or the registered users of the database proprietor of FIG. 1.

FIG. 6 shows an example audience measurement entity (AME) age category table.

FIG. 7 shows an example terminal node table showing tree model predictions for multiple leaf nodes of a classification tree.

DETAILED DESCRIPTION

Figure 1:
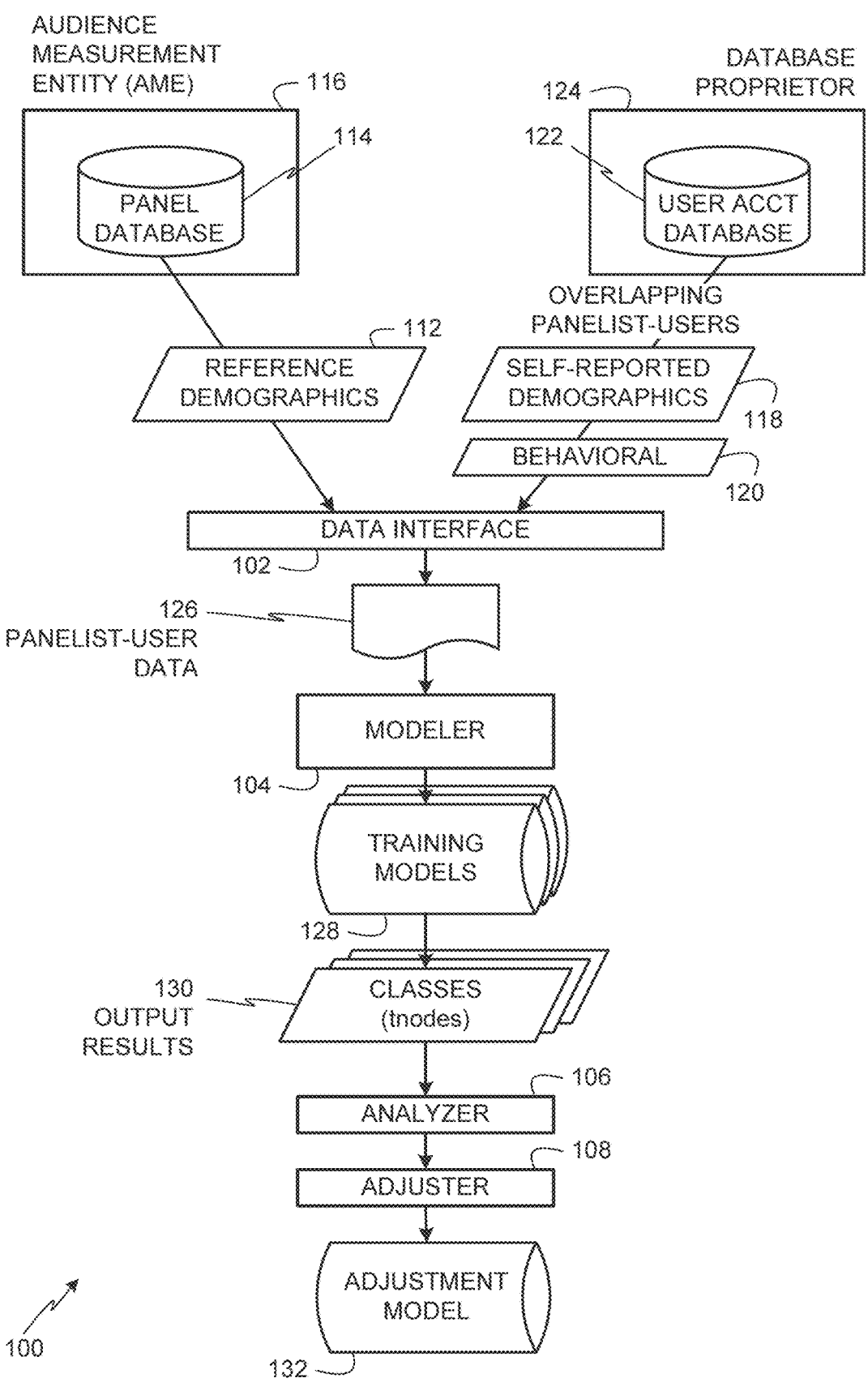
FIG. 1 illustrates an example apparatus that may be used to generate an adjustment model to adjust demographic information of audience members.

Example methods, apparatus, systems, and/or articles of manufacture disclosed herein may be used to analyze and adjust demographic information of audience members. Examples disclosed herein may be used for online audience measurements in which user-exposures to online content is monitored or measured. Web-based services or Internet-based services often require users to register in exchange for access to such services. Such registration processes elicit demographic information (e.g., gender, age, etc.) from users. The web-based or Internet-based services store the collected demographic information and, as such, the web-based or Internet-based services are referred to herein as demographic database proprietors (i.e., database proprietors). A database proprietor may be, for example, any entity that requests user information from users in exchange for access to online services such as Facebook, Google, Yahoo!, MSN, Twitter, Apple iTunes, Experian, etc. For online audience measurement processes, the collected demographic information may be used to identify different demographic markets to which online content exposures are attributable.

A problem facing online audience measurement processes is that the manner in which registered users represent themselves to online data proprietors is not necessarily veridical (e.g., accurate). Example approaches to online measurement that leverage account registrations at such online database proprietors to determine demographic attributes of an audience may lead to inaccurate demographic-exposure results if they rely on self-reporting of personal/demographic information by the registered users during account registration at the database proprietor site. There may be numerous reasons for why users report erroneous or inaccurate demographic information when registering for database proprietor services.

The self-reporting registration processes used to collect the demographic information at the database proprietor sites (e.g., social media sites) does not facilitate determining the veracity of the self-reported demographic information.

Examples disclosed herein overcome inaccuracies often found in self-reported demographic information found in the data of database proprietors (e.g., social media sites) by analyzing how those self-reported demographics from one data source (e.g., online registered-user accounts maintained by database proprietors) relate to reference demographic information of the same users collected by more reliable means (e.g., in-home or telephonic interviews conducted by the audience measurement entity as part of a panel recruitment process). In examples disclosed herein, an audience measurement entity (AME) collects reference demographic information for a panel of users (e.g., panelists) using highly reliable techniques (e.g., employees or agents of the AME telephoning and/or visiting panelist homes and interviewing panelists) to collect highly accurate information. In addition, the AME installs online meters at panelist computers to monitor exchanges between the metered computers of the panelists and servers of the database proprietors known to have the self-reported demographic information of the panelists. With cooperation by the database proprietors, the AME uses the collected monitoring data to link the panelist reference demographic information maintained by the AME to the self-reported demographic information maintained by the database proprietors on a per-person basis and to model the relationships between the highly accurate reference data collected by the AME and the self-report demographic information collected by the database proprietor (e.g., the social media site) to form a basis for adjusting or reassigning self-reported demographic information of other users of the database proprietor that are not in the panel of the AME. In this manner, the accuracy of self-reported demographic information can be improved when demographic-based online media-impression measurements are compiled for non-panelist users of the database proprietor(s).

A scatterplot 200 of baseline self-reported ages taken from a database of a database proprietor prior to adjustment versus highly reliable panel reference ages is shown in FIG. 2. The scatterplot 200 shows a clearly non-linear skew in the error distribution. This skew is in violation of the regression assumption of normally distributed residuals (i.e., systematic variance), which would lead to limited success when analyzing and adjusting self-reported demographic information using known linear approaches (e.g., regression, discriminant analysis). For example, such known linear approaches could introduce inaccurate bias or shift in demographics resulting in inaccurate conclusions. Unlike such linear approaches, examples disclosed herein do not generalize the entire dataset to a single function. In some such examples, classification, or tree-based, approaches are used to recursively split datasets into successively smaller and distinct groups based on which independent variables can account for the statistically strongest division. In examples disclosed herein, such independent variables are based on online user behavior such as, for example, quantities of user connections (e.g., online friends), quantities of mobile page views, year of school graduation, median year of school graduation for persons corresponding to the user connections, and a percent of friends which are female. The classification, or tree-based, approaches based on independent variables facilitate first segmenting the demographic data on the basis of behavioral variables and demographics to assess the degree of demographic matches within each distinct group (e.g., behavior-based groups) and then applying adjustments only to demographic data in need of correction, rather than affecting an entire distribution as would otherwise be done using known linear approaches.

Some disclosed example methods, apparatus, systems, and articles of manufacture to analyze and adjust demographic information of audience members involve generating a first model based on reference demographic data corresponding to panelists and based on second demographic data and behavioral data from a database proprietor. In some examples, the second demographic data and the behavioral data corresponding to ones of the panelists having user accounts with the database proprietor. Disclosed example methods also involve using the first model to partition the second demographic data into a plurality of nodes, each node representing a respective subset of the second demographic data. In addition, at least some of the second demographic data is redistributed between at least some of the nodes to generate a second model.

In some examples, the behavioral data includes at least one of a quantity of user connections (e.g., online friends), a quantity of mobile webpage views, an indicated year of school graduation, a median year of school graduation for persons corresponding to the user connections, and a percent of friends that are female. In some examples, the database proprietor provides a social networking service to registered users including non-panelists and ones of the panelists having user accounts with the database proprietor.

In some examples, the second model is applied to third demographic data at the database proprietor and a statistical analysis is performed on the output of the second model to determine whether to adjust at least some of the third demographic data based on the statistical analysis. In some examples, the third demographic data corresponds to registered users of the database proprietor. In some examples, some of the registered users include non-panelists. In some examples, the third demographic data corresponds to users for which impressions to advertisements are logged when the advertisements are rendered on computers of the users.

FIG. 1 illustrates an example apparatus 100 that may be used to model, analyze, and/or adjust demographic information of audience members in accordance with the teachings of this disclosure. The apparatus 100 of the illustrated example includes a data interface 102, a modeler 104, an analyzer 106, an adjuster 108, the training models 128, and the adjustment model 132. While an example manner of implementing the apparatus 100 has been illustrated in FIG. 1, one or more of the elements, processes and/or devices illustrated in FIG. 1 may be combined, divided, re-arranged, omitted, eliminated and/or implemented in any other way. Further, the data interface 102, the modeler 104, the analyzer 106, the adjuster 108, the training models 128, the adjustment model 132 and/or, more generally, the example apparatus 100 of FIG. 1 may be implemented by hardware, software, firmware and/or any combination of hardware, software, and/or firmware. Thus, for example, any of the data interface 102, the modeler 104, the analyzer 106, the adjuster 108, the training models 128, and the adjustment model 132 and/or, more generally, the example apparatus 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of the data interface 102, the modeler 104, the analyzer 106, the adjuster 108, the training models 128, and/or the adjustment model 132 is hereby expressly defined to include a tangible computer readable medium such as a memory, DVD, CD, etc. storing the software and/or firmware. Further still, the example apparatus 100 of FIG. 1 may include one or more elements, processes and/or devices in addition to, or instead of, those illustrated in FIG. 1, and/or may include more than one of any or all of the illustrated elements, processes and/or devices.

To obtain panel reference demographic data, self-reporting demographic data, and user online behavioral data, the example apparatus 100 is provided with the data interface 102. In the illustrated example of FIG. 1, the data interface 102 obtains reference demographics data 112 from a panel database 114 of an AME 116 storing highly reliable demographics information of panelists registered in one or more panels of the AME 116. In the illustrated example, the reference demographics information 112 in the panel database 114 is collected from panelists by the AME 116 using techniques which are highly reliable (e.g., in-person and/or telephonic interviews) for collecting highly accurate and/or reliable demographics. In the examples disclosed herein, panelists are persons recruited by the AME 116 to participate in one or more radio, movie, television and/or computer panels that are used to track audience activities related to exposures to radio content, movies, television content, computer-based media content, and/or advertisements on any of such media.

In addition, the data interface 102 of the illustrated example also retrieves self-reported demographics data 118 and/or behavioral data 120 from a user accounts database 122 of a database proprietor (DBP) 124 storing self-reported demographics information of users, some of which are panelists registered in one or more panels of the AME 116. In the illustrated example, the self-reported demographics data 118 in the user accounts database 122 is collected from registered users of the database proprietor 124 using, for example, self-reporting techniques in which users enroll or register via a webpage interface to establish a user account to avail themselves of web-based services from the database proprietor 124.

The database proprietor 124 of the illustrated example may be, for example, a social network service provider, an email service provider, an internet service provider (ISP), or any other web-based or Internet-based service provider that requests demographic information from registered users in exchange for their services. For example, the database proprietor 124 may be any entity such as Facebook, Google, Yahoo!, MSN, Twitter, Apple iTunes, Experian, etc. Although only one database proprietor is shown in FIG. 1, the AME 116 may obtain self-reported demographics information from any number of database proprietors.

In the illustrated example, the behavioral data 120 (e.g., user activity data, user profile data, user account status data, user account data, etc.) may be, for example, graduation years of high school graduation for friends or online connections, quantity of friends or online connections, quantity of visited web sites, quantity of visited mobile web sites, quantity of educational schooling entries, quantity of family members, days since account creation, '.edu' email account domain usage, percent of friends or online connections that are female, interest in particular categorical topics (e.g., parenting, small business ownership, high-income products, gaming, alcohol (spirits), gambling, sports, retired living, etc.), quantity of posted pictures, quantity of received and/or sent messages, etc.

In examples disclosed herein, a webpage interface provided by the database proprietor 124 to, for example, enroll or register users presents questions soliciting demographic information from registrants with little or no oversight by the database proprietor 124 to assess the veracity, accuracy, and/or reliability of the user-provided, self-reported demographic information. As such, confidence levels for the accuracy or reliability of self-reported demographics data stored in the user accounts database 122 are relatively low for certain demographic groups. There are numerous social, psychological, and/or online safety reasons why registered users of the database proprietor 124 inaccurately represent or even misrepresent demographic information such as age, gender, etc.

In the illustrated example, the self-reported demographics data 118 and the behavioral data 120 correspond to overlapping panelist-users. Panelist-users are hereby defined to be panelists registered in the panel database 114 of the AME 116 that are also registered users of the database proprietor 124. The apparatus 100 of the illustrated example models the propensity for accuracies or truthfulness of self-reported demographics data based on relationships found between the reference demographics 112 of panelists and the self-reported demographics data 118 and behavioral data 120 for those panelists that are also registered users of the database proprietor 124.

To identify panelists of the AME 116 that are also registered users of the database proprietor 124, the data interface 102 of the illustrated example can work with a third party that can identify panelists that are also registered users of the database proprietor 124 and/or can use a cookie-based approach. For example, the data interface 102 can query a third-party database that tracks persons that have registered user accounts at the database proprietor 124 and that are also panelists of the AME 116. Alternatively, the data interface 102 can identify panelists of the AME 116 that are also registered users of the database proprietor 124 based on information collected at web client meters installed at panelist client computers for tracking cookie IDs for the panelist members. In this manner, such cookie IDs can be used to identify which panelists of the AME 116 are also registered users of the database proprietor 124. In either case, the data interface 102 can effectively identify all registered users of the database proprietor 124 that are also panelists of the AME 116.

After distinctly identifying those panelists from the AME 116 that have registered accounts with the database proprietor 124, the data interface 102 queries the user database 122 for the self-reported demographic data 118 and the behavioral data 120. In addition, the data interface 102 compiles relevant demographic and behavioral information into a panelist-user data table 126. In some examples, the panelist-user data table 126 may be joined to the entire user base of the database proprietor 124 based on, for example, cookie values, and cookie values may be hashed on both sides (e.g., at the AME 116 and at the database proprietor 124) to protect privacies of registered users of the database proprietor 124.

An example listing of demographic and behavioral variables from the AME 116 and from the database proprietor 124 is shown in a raw demographic and behavioral variables table 400 of FIGS. 4A-4C. In the illustrated example, the data interface 102 analyzes the raw demographic and behavioral variables table 400 to select particular ones of the variables to be used for modeling. In addition, the data interface 102 adds variables from the AME 116 corresponding to panelists and recodes the selected ones of the variables from the raw demographic and behavioral variables table 400 of FIGS. 4A-4C. In the illustrated example, the data interface 102 generates a recoded demographic and behavioral variables table 500 shown in FIGS. 5A and 5B with names and definitions of the recoded variables. For example, the data interface 102 computes several values to index the degree of demographic match/mismatch between the reference demographic data 112 provided by the AME 116 and the self-reported demographic data 118 provided by the database proprietor 124. In the illustrated example, the data interface 102 assigns Boolean values to each person represented in the table in an 'age_match' field 502 (FIG. 5B) based on whether their ages in both the reference demographics 112 and the self-reported demographics 118 matched. The data interface 102 of the illustrated example also assigns another Boolean value in a 'gen_match' field 504 (FIG. 5B) if the genders matched across the reference demographics 112 and the self-reported demographics 118. The data interface 102 of the illustrated example also assigns a third Boolean value in a 'perfect_match' field 506 (FIG. 5B) for the conjunction of matches in both age and gender.

At least some of the variables shown in the recoded demographic and behavioral variables table 500 for model generation are recoded from their raw form from the raw demographic and behavioral variables table 400 of FIGS. 4A-4C to be better or more meaningfully handled by a recursive partitioning tool (e.g., R Party Package). In the illustrated example of FIGS. 5A and 5B, the data interface 102 recodes continuous variables as quartile and decile categories when the median is greater than zero or otherwise as Booleans. In addition, the data interface 102 places categorical variables coded as integers with ordinally matched letters of the alphabet.

In example ideal situations, there will be one-to-one user-level matches for panelists and database proprietor registered users between the recoded cookies records with no duplicates. However, when cookies are collected (e.g., using a household web client meter) from client computer sessions, a single household member may generate more than one cookie and/or multiple household members of the same panel household may be tracked using the same cookie value. As such, cookie records recoded based on the recoded demographic and behavioral variables table 500 may contain duplicates or partial duplicates. In the illustrated example, the data interface 102 processes the recoded cookie records to filter out duplicate panelist and/or self-reported user records merged therein. The data interface 102 of the illustrated example flags each recoded cookie record with a first Boolean flag based on whether a panel member assignment of a cookie from a browsing session that it came from matched a registered user of the database proprietor 124 to whom it was classified. In addition, the data interface 102 flags each recoded cookie record with a second Boolean flag based on whether the panel member assignment of the cookie matches a cookie from a user login prompt of the database proprietor 124. The data interface 102 then populates a modeling subset in the panelist-user data 126 with recoded cookie records having true values for both Boolean flags as well as any other records with non-duplicated cookie values, provided that they did not introduce mismatched gender data into the model (perfect_match=1). In the illustrated example, the data interface 102 provides the panelist-user data 126 for use by the modeler 104.

In the illustrated example of FIG. 1, the apparatus 100 is provided with the modeler 104 to generate a plurality of training models 128. The apparatus 100 selects from one of the training models 128 to serve as an adjustment model 132 that is deliverable to the database proprietor 124 for use in analyzing and adjusting other self-reported demographic data in the user account database 122 as discussed below in connection with FIG. 3. In the illustrated example, each of the training models 128 is generated from a training set selected from the panelist-user data 126. For example, the modeler 104 generates each of the training models 128 based on a different 80% of the panelist-user data 126. In this manner, each of the training models 128 is based on a different combination of data in the panelist-user data 126.

Each of the training models 128 of the illustrated example includes two components, namely tree logic and a coefficient matrix. The tree logic refers to all of the conditional inequalities characterized by split nodes between root and terminal nodes, and the coefficient matrix contains values of a probability density function (PDF) of AME demographics (e.g., panelist ages of age categories shown in an AME age category table 600 of FIG. 6) for each terminal node of the tree logic. In a terminal node table 700 of FIG. 7, coefficient matrices of terminal nodes are shown in A_PDF through M_PDF columns 708 in the terminal node table 700.

In the illustrated example, the modeler 104 is implemented using a classification tree (ctree) algorithm from the R Party Package, which is a recursive partitioning tool described by Hothorn, Hornik, & Zeileis, 2006. The R Party Package may be advantageously used when a response variable (e.g., an AME age group of an AME age category table 600 of FIG. 6) is categorical, because a ctree of the R Party Package accommodates non-parametric variables. Another example advantage of the R Party Package is that the two-sample tests executed by the R Party Package party algorithm give statistically robust binary splits that are less prone to over-fitting than other classification algorithms (e.g., such as classification algorithms which utilized tree pruning based on cross-validation of complexity parameters, rather than hypothesis testing). The modeler 104 of the illustrated example generates tree models composed of root, split, and/or terminal nodes, representing initial, intermediate, and final classification states, respectively.

In the illustrated examples disclosed herein, the modeler 104 initially randomly defines a partition within the modeling dataset of the panelist-user data 126 such that different 80% subsets of the panelist-user data 126 are used to generate the training models. Next, the modeler 104 specifies the variables that are to be considered during model generation for splitting cases in the training models 128. In the illustrated example, the modeler 104 selects 'rpt-agecat' as the response variable for which to predict. As shown in FIG. 5B, 'rpt-agecat' represents AME reported ages of panelists collapsed into buckets. FIG. 6 shows an example AME age category table 600 containing a breakdown of age groups established by the AME 116 for its panel members. An example advantage of predicting for groups of ages rather than exact ages is that it is relatively simpler to predict accurately for a bigger target (e.g., a larger quantity of people).

In the illustrated example, the modeler 104 uses the following variables as predictors from the self-reported demographics 118 and the behavioral data 120 of the database proprietor 124 to split the cases: Age, gendercat, hsyear_bln (year of high school graduation), current_address_present (current address is present), self_report_zip_bln, asprofilepicturepresent (user profile picture is present), screenname_present (screen name is present), mobilephone_present (mobile telephone number is present), birthdayprivacy (birthday is hidden as private), friend_count_iqr/idr (quantity of friends), dbpage_iqr/idr, active30 day (user activity occurred within last 30 days), active7 day (user activity occurred within last 7 days), mobile_active7 day (user activity occurred within last 7 days via a mobile device), web_active7 day (web browsing user activity occurred within last 7 days), user_cluster, user_assigned_cluster, reg_with_edu_email_bln (registered email address contains a .edu domain), using_edu_email_bln (user has used email address containing a .edu domain), median_friends_age (median age of online friends), median_friends_regage (median age of online registered friends), and percent_female_friends_iqr/idr (percent of friends that are female). These variables are shown in the recoded demographic and behavioral variables table 500 of FIGS. 5A and 5B. In the illustrated example, the modeler 104 omits any variable having little to no variance or a high number of null entries.

In the illustrated example, the modeler 104 performs multiple hypothesis tests in each node and implements compensations using standard Bonferroni adjustments of p-values. The modeler 104 of the illustrated example chooses a standard minimum of 0.05 alpha/p criterion for all splits, and at least 25 cases in final terminal nodes. For instances with small quantities of records in the panelist-user data 126, terminal node classifications with less than 25 cases may exhibit low stability.

In the illustrated example, any single training model 128 generated by the modeler 104 may exhibit unacceptable variability in final analysis results procured using the training model 128. To provide the apparatus 100 with a training model 128 that operates to yield analysis results with acceptable variability (e.g., a stable or accurate model), the modeler 104 of the illustrated example executes a model generation algorithm iteratively (e.g., one hundred (100) times) based on the above-noted parameters specified by the modeler 104.

For each of the training models 128, the apparatus 100 analyzes the list of variables used by the training model 128 and the distribution of output values to make a final selection of one of the training models 128 for use as the adjustment model 132. In particular, the apparatus 100 performs its selection by (a) sorting the training models 128 based on their overall match rates collapsed over age buckets (e.g., the age categories shown in the AME age category table 600 of FIG. 6); (b) excluding ones of the training models 128 that produce results beyond a standard deviation from an average of results from all of the training models 128; (c) from those training models 128 that remain, determining which combination of variables occurs most frequently; and (d) choosing one of the remaining training models 128 that outputs acceptable results that recommend adjustments to be made within problem age categories (e.g., ones of the age categories of the AME age category table 600 in which ages of the self-reported demographics 118 are false or inaccurate) while recommending no or very little adjustments to non-problematic age categories. In the illustrated example, one of the training models 128 selected to use as the adjustment model 132 includes the following variables: dbp_age (user age reported to database proprietor), dbp_friend_count_iqr/idr (number of online friends), dbp_median_friends_regage (median age of online registered friends), dbp_birthdayprivacy (birthday is hidden as private), dbp_median_friends_age (median age of online friends), dbp_hsyear_bln (year of high school graduation), and dbp_dbpage_iqr (age reported to database proprietor).

In the illustrated example, to evaluate the training models 128, output results 130 are generated by the training models 128. Each output result set 130 is generated by a respective training model 128 by applying it to the 80% data set of the panelist-user data 126 used to generate it and to the corresponding 20% of the panelist-user data 126 that was not used to generate it. In this manner, the analyzer 106 can perform within-model comparisons based on results from the 80% data set and 20% data set to determine which of the training models 128 provide consistent results across data that is part of the training model (e.g., the 80% data set used to generate the training model) and data to which the training model was not previously exposed (e.g., the 20% data set). In the illustrated example, for each of the training models 128, the output results 130 include a coefficient matrix (e.g., A_PDF through M_PDF columns 708 of FIG. 7) of the demographic distributions (e.g., age distributions) for the classes (e.g., age categories shown in an AME age category table 600 of FIG. 6) of the terminal nodes.

FIG. 7 shows an example terminal node table 700 showing tree model predictions for multiple leaf nodes of the output results 130. The example terminal node table 700 shows three leaf node records 702a-c for three leaf nodes generated using the training models 128. Although only three leaf node records 702a-c are shown in FIG. 7, the example terminal node table 700 includes a leaf node record for each AME age falling into the AME age categories or buckets shown in the AME age category table 600.

In the illustrated example, each output result set 130 is generated by running a respective training model 128 to predict the AME age bucket (e.g., the age categories of the AME age category table 600 of FIG. 6) for each leaf. The analyzer uses the resulting predictions to test the accuracy and stability of the different training models 128. In examples disclosed herein, the training models 128 and the output results 130 are used to determine whether to make adjustments to demographic information (e.g., age), but are not initially used to actually make the adjustments. For each row in the terminal node table 700, which corresponds to a distinct terminal node (T-NODE) for each training model 128, the accuracy is defined as the proportion of database proprietor observations that have an exact match in age bucket to the AME age bucket (e.g., a column titled 'DBP_ACC' in the terminal node table 700 of FIG. 7). In the illustrated example, the analyzer 106 evaluates each terminal node individually.

In the illustrated example, the analyzer 106 evaluates the training models 128 based on two adjustment criteria: (1) an AME-to-DBP age bucket match, and (2) out-of-sample-reliability. Prior to evaluation, the analyzer 106 modifies values in the coefficient matrix (e.g., the A_PDF through M_PDF columns 708 of FIG. 7) for each of the training models 128 to generate a modified coefficient matrix (e.g., A-M columns 710 of FIG. 7). By generating the modified coefficient matrix, the analyzer 106 normalizes the total number of users for particular training model 128 to one such that each coefficient in the modified coefficient matrix represents a percentage of the total number of users. In this manner, after the analyzer 106 evaluates the coefficient matrix (e.g., the A_PDF through M_PDF columns 708 of FIG. 7) for each terminal node of the training models 128 against the two adjustment criteria (e.g., (1) an AME-to-DBP age bucket match, and (2) out-of sample-reliability), the analyzer 106 can provide a selected modified coefficient matrix of the A-M columns 710 of FIG. 7 as part of the adjustment model 132 deliverable for use by the database proprietor 124 on any number of users.

During the evaluation process, the analyzer 106 performs AME-to-DBP age bucket comparisons, which is a within-model evaluation, to identify ones of the training models 128 that do not produce acceptable results based on a particular threshold. In this manner, the analyzer 106 can filter out or discard ones of the training models 128 that do not show repeatable results based on their application to different data sets. That is, for each training model 128 applied to respective 80%/20% data sets, the analyzer 106 generates a user-level DBP-to-AME demographic match ratio by comparing quantities of DBP registered users that fall within a particular demographic category (e.g., the age ranges of age categories shown in an AME age category table 600 of FIG. 6) with quantities of AME panelists that fall within the same particular demographic category. For example, if the results 130 for a particular training model 128 indicate that 100 AME panelists fall within the 25-29 age range bucket and indicate that 90 DBP users fall within the same bucket (e.g., an age bucket of age categories shown in an AME age category table 600 of FIG. 6), the user-level DBP-to-AME demographic match ratio for that training model 128 is 0.9 (90/100). If the user-level DBP-to-AME demographic match ratio is below a threshold, the analyzer 106 identifies the corresponding one of the training models 128 as unacceptable for not having acceptable consistency and/or accuracy when run on different data (e.g., the 80% data set and the 20% data set).

After discarding unacceptable ones of the training models 128 based on the AME-to-DBP age bucket comparisons of the within-model evaluation, a subset of the training models 128 and corresponding ones of the output results 130 remain. The analyzer 106 then performs an out-of-sample performance evaluation on the remaining training models 128 and the output results 130. To perform the out-of-sample performance evaluation, the analyzer 106 performs a cross-model comparison based on the behavioral variables in each of the remaining training models 128. That is, the analyzer 106 selects ones of the training models 128 that include the same behavioral variables. For example, during the modeling process, the modeler 104 may generate some of the training models 128 to include different behavioral variables. Thus, the analyzer 106 performs the cross-model comparison to identify those ones of the training models 128 that operate based on the same behavioral variables.

After identifying ones of the training models 128 that (1) have acceptable performance based on the AME-to-DBP age bucket comparisons of the within-model evaluation and (2) include the same behavioral variables, the analyzer 106 selects one of the identified training models 128 for use as the deliverable adjustment model 132. After selecting one of the identified training models 128, the adjuster 108 performs adjustments to the modified coefficient matrix of the selected training model 128 based on assessments performed by the analyzer 106.

The adjuster 108 of the illustrated example is configured to make adjustments to age assignments only in cases where there is sufficient confidence that the bias being corrected for is statistically significant. Without such confidence that an uncorrected bias is statistically significant, there is a potential risk of overzealous adjustments that could skew age distributions when applied to a wider registered user population of the database proprietor 124. To avoid making such overzealous adjustments, the analyzer 106 uses two criteria to determine what action to take (e.g., whether to adjust an age or not to adjust an age) based on a two-stage process: (a) check data accuracy and model stability first, then (b) reassign to another age category only if accuracy will be improved and the model is stable, otherwise leave data unchanged. That is, to determine which demographic categories (e.g., age categories shown in an AME age category table 600 of FIG. 6) to adjust, the analyzer 106 performs the AME-to-DBP age bucket comparisons and identifies categories to adjust based on a threshold. For example, if the AME demographics indicate that there are 30 people within a particular age bucket and less than a desired quantity of DBP users match the age range of the same bucket, the analyzer 106 determines that the value of the demographic category for that age range should be adjusted. Based on such analyses, the analyzer 106 informs the adjuster 108 of which demographic categories to adjust. In the illustrated example, the adjuster 108 then performs a redistribution of values among the demographic categories (e.g., age buckets). The redistribution of the values forms new coefficients of the modified coefficient matrix (e.g., values in the A-M columns 710 of FIG. 7) for use as correction factors when the adjustment model 132 is delivered and used by the database proprietor 124 on other user data (e.g., self-reported demographics 302 and behavioral data 304 of FIG. 3 corresponding to users for which media impressions are logged).

In the illustrated example, the adjuster 108 does not adjust nodes containing data where 'DBP_ACC' was already relatively very high. In the illustrated example, 'DBP_ACC' stands for database proprietor accuracy, and it is indicative of the amount of accuracy in demographic data (e.g., age) in the self-reported demographic data of the database proprietor 124. This accuracy measure is a proportion ranging from zero to one, thus, the variance in 'DBP_ACC' between different nodes could be characterized by the binomial distribution. In the illustrated example, to determine which nodes to adjust, the adjuster 108 performs calculations at the 99% percent confidence level, with the binomial equation 'DBP_ACC'+/−2.3*sqrt ('DBP_ACC'*(1−'DBP_ACC')/N) where N is the training sample size within the leaf (e.g., a 'WTS.TRAIN' column in the terminal node table 700 of FIG. 7). If the upper limit of these calculations exceeds or equals 100% for a leaf (e.g., one of the leaf node records 702*a-c*) then no adjustment (e.g., an adjustment of age) is made for that leaf. In other words, adjustments are not made to data that already appears to be of relatively very high accuracy (e.g., based on the database proprietor accuracy parameter 'DBP_ACC').

For each row of the terminal node table 700, the analyzer 106 defines the training and test accuracy as the proportion of observations where AME age bucket matches the predicted age bucket for a respective leaf node. In the illustrated example, the analyzer 106 calculates the error as one minus the accuracy proportion. The analyzer 106 performs this calculation for the training (leaf accuracy ('LEAFACC')) and test (out of sample accuracy ('OOSACC')). In the illustrated example, the analyzer 106 does not use a separate training model 128 for the test data set (e.g., a 20% portion of the panelist-user data 126). Instead, the training model 128 is used to score and predict the test data set. The difference between 'LEAFACC' and 'OOSACC' should be relatively small if classifications are stable in a node between training and test datasets. Such small difference indicates that the classification is robust enough to be generalized to new observations (e.g., the media impressions-based self-reported demographics 302 and behavioral data 304 of FIG. 3) during, for example, final production use of the adjustment model 132 at the database proprietor 124. In the illustrated example, the analyzer 106 computes the accuracy of each leaf for the training data set and test data set, then the analyzer 106 computes the differences in these accuracy measures and standardizes them into Z-scores represented in 'Z' column 704 of the terminal node table 700 of FIG. 7. In the illustrated example, Z-scores have a mean of zero and a standard deviation of one. The analyzer 106 calculates the Z-scores as follows: Z-score per leaf=((Pa−

Pt)–Average (Pa–Pt))/standard deviation (Pa–Pt). In the illustrated example, the analyzer 106 determines that the adjuster 108 should not make any adjustments for nodes with Z-scores greater than plus or minus one, because nodes with Z-scores greater than plus or minus one are indicative of performance between training and test data sets that is not stable enough to have sufficient confidence that an adjustment would be only correcting bias and not introducing additional variance.

In the illustrated example of FIG. 7, each terminal node (e.g., each of the leaf node records 702*a-c*) contains a probability density function (PDF) characterizing the true distribution of AME ages predicted across the age buckets (e.g., the A_PDF through M_PDF columns 708 in the terminal node table 700). To determine an age adjustment, the adjuster 108 multiplies each of the age bucket coefficients (e.g., the modified coefficient matrices (MCM) of the A-M columns 710 in the terminal node table 700) (which are normalized to sum to one) by the total weights in that tree node (tn) to get the exact number of cases in each AME age bucket using, for example, a convolution process (e.g., Ntn_i*MCM). A 'USEPDF' column 706 in the terminal node table 700 of FIG. 7 stores Boolean values representing the outcome of the two-criterion decision process described above. In the 'USEPDF' column 706, zeros indicate high-quality data not to be disturbed whereas ones indicate low accuracy in the self-reported demographics 118 of FIG. 1 and stable model performance. In the illustrated example of FIG. 7, the collection of PDF coefficients for all terminal nodes are noted in the A_PDF through M_PDF columns 708 to form the coefficient matrix. Comparing the coefficient matrices in the A_PDF through M_PDF columns 708 of the terminal node table 700 to modified coefficient matrices of the A-M columns 710, rows with a 'USEPDF' value equal to one have the same values for corresponding coefficients of the coefficient matrices 708 and 710. Rows with a 'USEPDF' value equal to zero have a lone coefficient of one placed into the corresponding database proprietor age bucket being predicted by the leaf node. In such examples, the modified coefficient matrix (MCM) in the A-M columns 710 is part of the adjustment model 132 deliverable from the AME 116 to the database proprietor 124 to inform the database proprietor 124 of inaccuracies in their self-reported demographics 118. In the illustrated example, multiplying the MCM of the A-M columns 710 by the total counts from the terminal nodes (e.g., the leaf node records 702*a-c*) gives adjusted age assignments.

In some examples, to analyze and adjust self-reported demographics data from the database proprietor 124 based on users for which media impressions were logged, the database proprietor 124 delivers aggregate audience and media impression metrics to the AME 116. These metrics are aggregated not into multi-year age buckets (e.g., such as the age buckets of the AME age category table 600 of FIG. 6), but in individual years. As such, prior to delivering the PDF to the database proprietor 124 for implementing the adjustment model 132 in their system, the adjuster 108 redistributes the probabilities of the PDF from age buckets into individual years of age. In such examples, each registered user of the database proprietor 124 is either assigned their initial self-reported age or adjusted to a corresponding AME age depending on whether their terminal node met an adjustment criteria. Tabulating the final adjusted ages in years, rather than buckets, by terminal nodes and then dividing by the sum in each node splits the age bucket probabilities into a more useable, granular form.

In some examples, after the adjuster 108 determines the adjustment model 132, the model 132 is provided to the database proprietor 124 to analyze and/or adjust other self-reported demographic data of the database proprietor 124. For example, the database proprietor 124 may use the adjustment model 132 to analyze self-reported demographics of users for which impressions to certain media were logged. In this manner, the database proprietor 124 can generate data indicating which demographic markets were exposed to which types of media and, thus, use this information to sell advertising and/or media content space on web pages served by the database proprietor 124. In addition, the database proprietor 124 may send their adjusted impression-based demographic information to the AME 116 for use by the AME in assessing impressions for different demographic markets.

Figure 3:
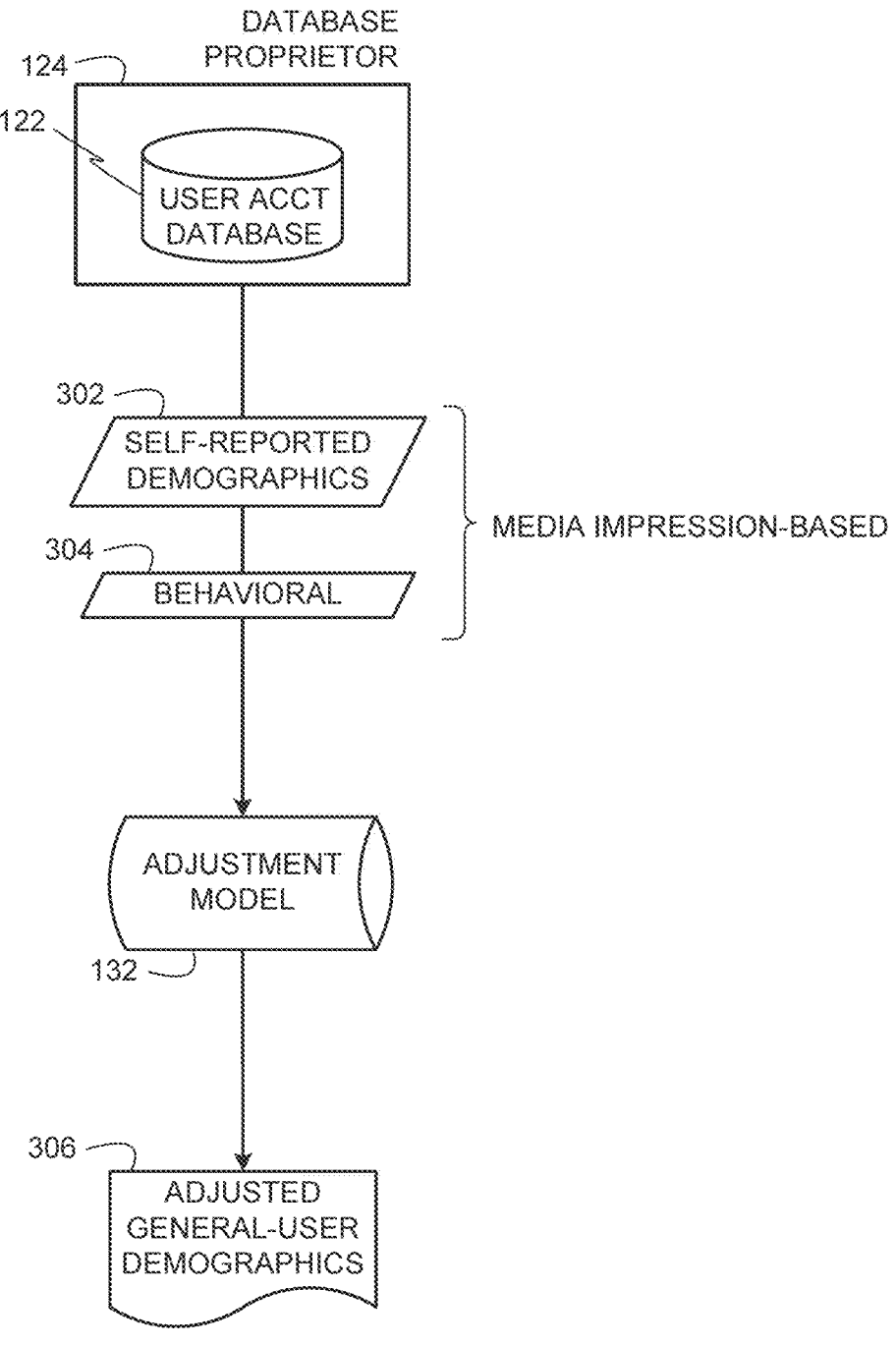
FIG. 3 illustrates an example manner of using an adjustment model from FIG. 1 to analyze and/or adjust demographic information of audience members.

In the examples disclosed herein, the adjustment model 132 is subsequently used by the database proprietor 124 as shown in FIG. 3 to analyze other self-reported demographics and behavioral data (e.g., self-reported demographics 302 and behavioral data 304 of FIG. 3) from the user account database 122 to determine whether adjustments to such data should be made.

FIG. 3 illustrates an example manner of using the adjustment model 132 of FIG. 1 to analyze and/or adjust demographic information of audience members. In the illustrated example, the adjustment model 132 is installed at the database proprietor 124 to run in an automated, production basis. In some examples, before providing the adjustment model 132 to the database proprietor 124, a few adjustments may be made to customize the model 132 to facilitate use by the database proprietor 124. For example, quartile and decile variables that had been used to generate model fits during evaluation of the training models may be reverted back to their continuous forms. In addition, the user_assigned_cluster variable may be excluded because it is a model predicted value that may be too dynamic to use for classification over any extended period of time.

In some examples, the database proprietor 124 applies the adjustment model 132 to a single user at a time following advertisement impressions logged for that user, rather than applying the adjustment model 132 to the total count of individuals in a terminal node at the end of a day (or other measureable duration). Each registered user of the database proprietor 124 is placed in a terminal node (e.g., one of the leaf node records 702*a-c* of FIG. 7) depending on their behavior and demographics and then divided fractionally over years of age as described by the PDF in that terminal node. These probabilistic "parts" of a registered user sum over the course of a day's impressions before they are aggregated and delivered to the AME 116. In the illustrated examples, rounding up to the nearest person before reporting has a negligible effect on the final counts.

During use of the adjustment model 132 to analyze and/or adjust self-reported demographics of the database proprietor 124, the model 132 receives media impression-based self-reported demographics 302 and media-impression based behavioral data 304 corresponding to registered users of the database proprietor 124 for which one or more media impressions were logged. In the illustrated example, a media impression is logged for a user upon detecting that a webpage rendered on a client computer of the user presented particular tracked media content (e.g., an advertisement, a video/audio clip, a movie, a television program, a graphic, etc.). In some examples, the database proprietor 124 may log media impressions using cookie-logging techniques disclosed in U.S. provisional patent application No. 61/385, 553, filed on Sep. 22, 2010, and U.S. provisional application No. 61/386,543, filed on Sep. 26, 2010, both of which are hereby incorporated herein by reference in their entireties.

In the illustrated example, the adjustment model 132 selects demographic data (e.g., self-reported ages) from the media-impression based self-reported demographics 302 to be analyzed (e.g., self-reported user ages). In addition, the adjustment model 132 selects behavioral data from the media-impression based behavioral data 304 corresponding to behavioral variables (e.g., behavioral variables in the recoded demographic and behavioral variables table 500 of FIGS. 5A and 5B) used in the adjustment model 132.

In the illustrated example, the database proprietor 124 applies the adjustment model 132 on the selected demographic data (e.g., self-reported ages) and the selected behavioral data to determine whether to make adjustments to the selected demographic data. For example, to perform such an analysis, the adjustment model 132 generates a terminal node table similar to the terminal node table 700 of FIG. 7. The adjustment model 132 then analyzes the Z-score for each leaf node record (e.g., the Z-score for the 'Z' column of each leaf node record 702*a-c* of FIG. 7) and determines that adjustments should be made for nodes with Z-scores greater than plus or minus one. The adjustment model 132 then determines which nodes should be adjusted.

In the illustrated example, the adjustment model 132 adjusts demographic data (e.g., self-reported age) of nodes that it identified as needing adjustment. In particular, the adjustment model 132 uses a statistical analysis, such as a Bayesian analysis, to compare the self-reported demographics (e.g., self-reported ages) needing adjustment with a probability distribution of accurate ages grouped into similar behavioral categories as behavioral categories selected for the self-reported demographics. In the illustrated example, the probability distribution of accurate ages grouped into similar behavioral categories are provided in the adjustment model 132 corresponding to panelists for which behaviors indicate similar behavioral categories. For example, the Bayesian analysis may be performed on self-reported ages of users having a certain percentage of friends (e.g., online social networking connections) that graduated high school (hs) within a particular median number of years as they did. In this manner, the adjustment model 132 may use the Bayesian analysis to determine relatively most suitable adjustments to be made for each self-reported age. After the adjustment model 132 adjusts the self-reported demographics, the adjustment model 132 outputs the adjusted results as adjusted general-user demographics data 306. In some examples the database proprietor 124 can provide the adjusted general-user demographics data 306 for corresponding media impressions to the AME 116.

Figure 8A:
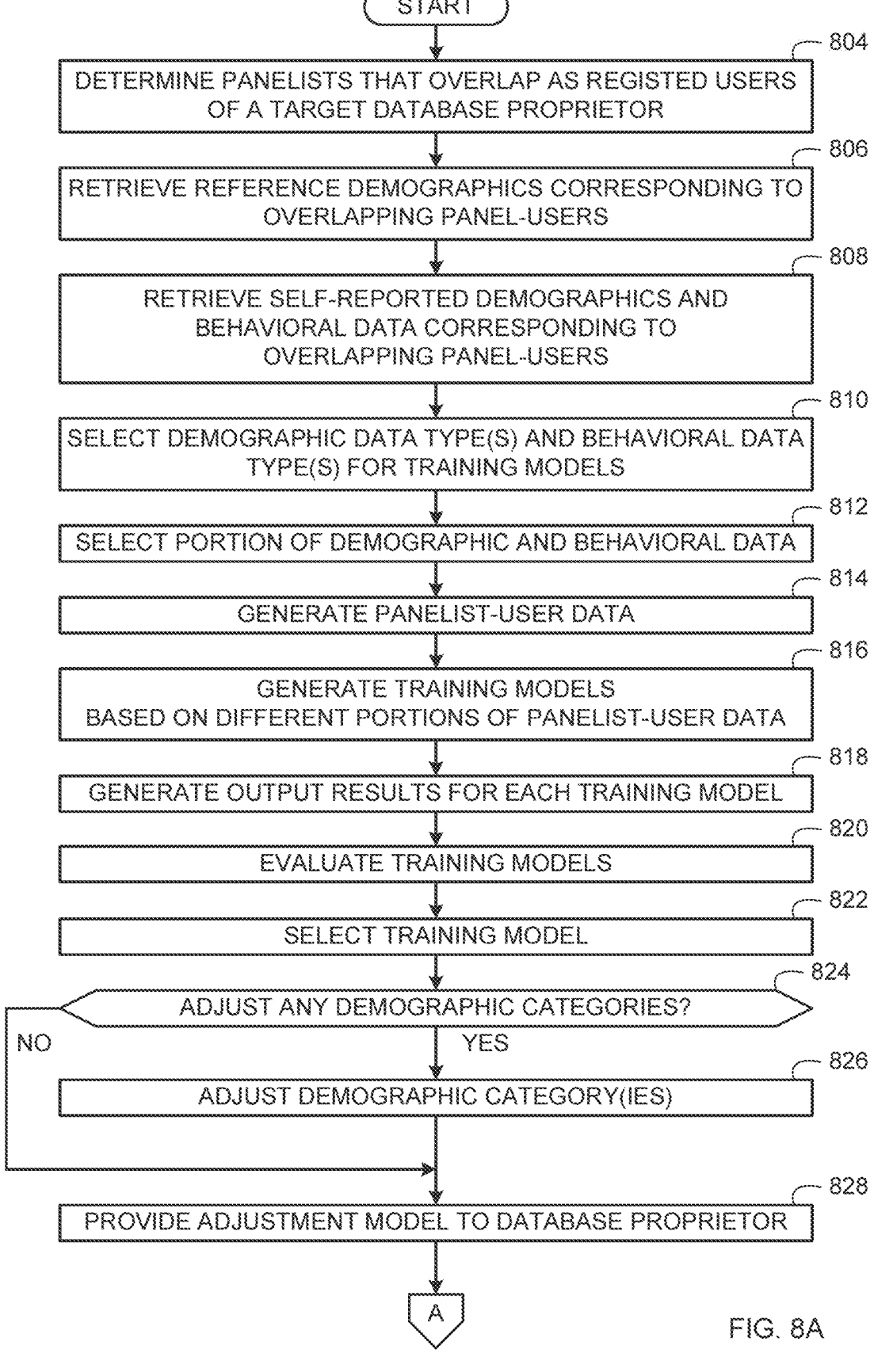
FIGS. 8A and 8B are a flow diagram representative of example machine readable instructions that may be executed to generate an adjustment model, to analyze demographic data based on the adjustment model, and/or to adjust demographic data.
Figure 8B:
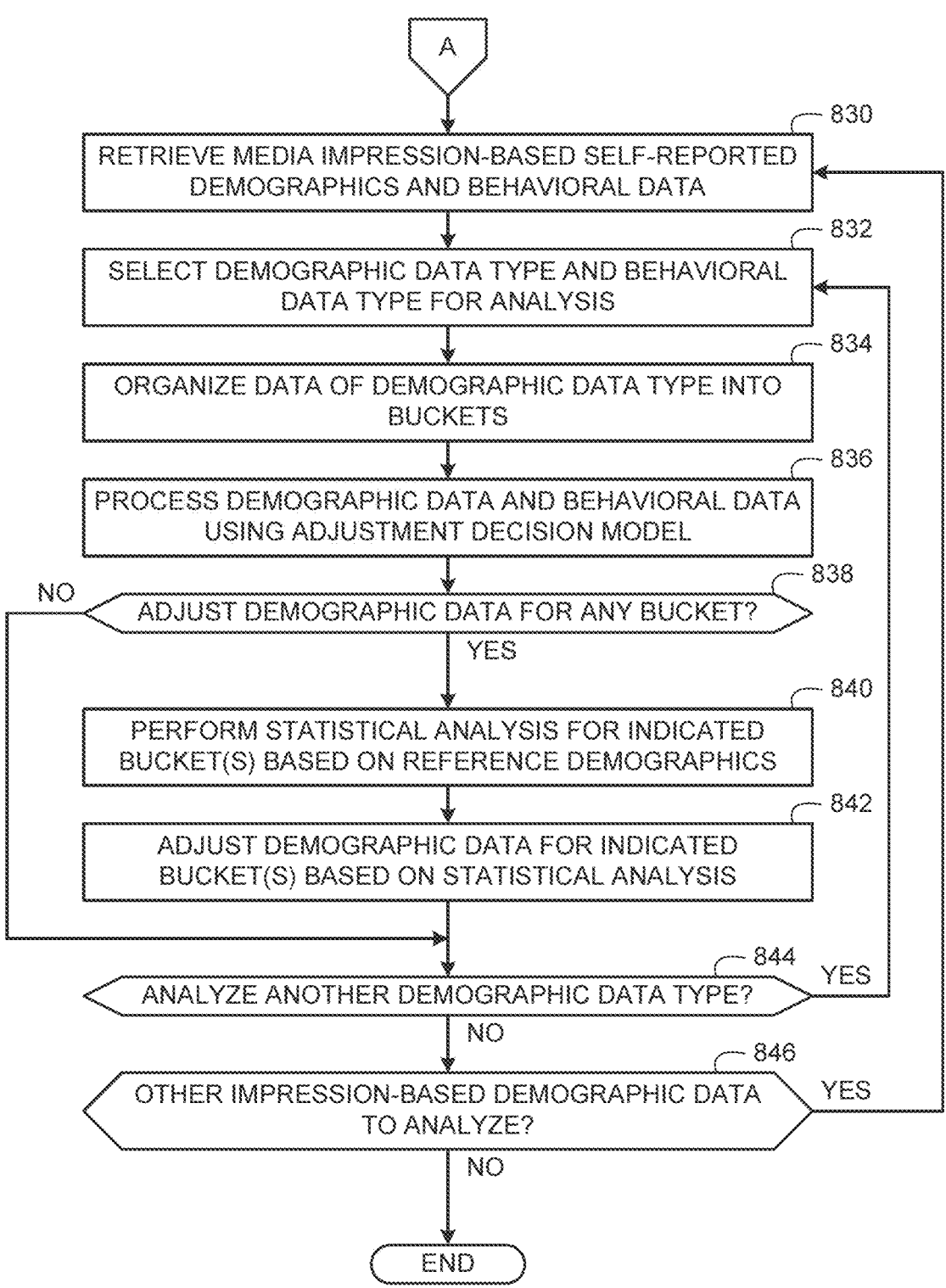

FIGS. 8A and 8B illustrate a flow diagram representative of example machine readable instructions that may be executed to generate the adjustment model 132, analyze demographic data (e.g., the media-impression based self-reported demographics 302 of FIG. 1) based on the adjustment model 132, and/or adjust the demographic data (e.g., the media-impression based self-reported demographics 302). The example processes of FIGS. 8A and 8B may be implemented using machine readable instructions that, when executed, cause a device (e.g., a programmable controller, processor (e.g., the processor 912 of FIG. 9), or other programmable machine or integrated circuit) to perform the operations shown in FIGS. 8A and 8B. For instance, the example processes of FIGS. 8A and 8B may be performed using a processor, a controller, and/or any other suitable processing device. For example, the example processes of FIGS. 8A and 8B may be implemented using coded instructions stored on one or more tangible machine readable mediums such as one or more of a flash memory, a read-only memory (ROM), and/or a random-access memory (RAM).

As used herein, the term tangible machine readable medium or tangible computer readable medium is expressly defined to include any type of computer readable storage and to exclude propagating signals. Additionally or alternatively, the example processes of FIGS. 8A and 8B may be implemented using coded instructions (e.g., computer readable instructions) stored on one or more non-transitory computer readable mediums such as one or more of a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, the example processes of FIGS. 8A and 8B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example processes of FIGS. 8A and 8B may be implemented as any combination(s) of any of the foregoing techniques, for example, any combination of firmware, software, discrete logic and/or hardware.

Although the example processes of FIGS. 8A and 8B are described with reference to the flow diagram of FIGS. 8A and 8B, other methods of implementing the processes of FIGS. 8A and 8B may be employed. For example, the order of execution of the blocks may be changed, and/or some of the blocks described may be changed, eliminated, subdivided, or combined. Additionally, one or more of the example processes of FIGS. 8A and 8B may be performed sequentially and/or in parallel by, for example, separate processing threads, processors, devices, discrete logic, circuits, etc.

Turning to FIG. 8A, initially, the data interface 102 (FIG. 1) determines panelists that overlap as also being registered users of a target database proprietor (e.g., the database proprietor 124 of FIGS. 1 and 2) (block 804). The data interface 102 retrieves the reference demographics 112 (e.g., from the panel database 114 of the AME 116 of FIG. 1) that correspond to ones of the panelists that are also registered users of the database proprietor 124 (block 806). In addition, the data interface 102 retrieves the self-reported demographics 118 and the behavioral data 120 (e.g., from the user account database 122 of the database proprietor 124 of FIG. 1) that correspond to ones of the panelists that are also registered users of the database proprietor 124 (block 808).

The data interface 102 selects one or more demographic data type(s) and one or more behavioral data type(s) on which to base the training models 128 (block 810). For example, the data interface 102 may receive a user-specified demographic data type (e.g., age, gender, etc.) and behavioral data type (e.g., graduation years of high school graduation for friends or online connections, quantity of friends or online connections, quantity of visited web sites, quantity of visited mobile web sites, quantity of educational schooling entries, quantity of family members, days since account creation, '.edu' email account domain usage, percent of friends or online connections that are female, interest in particular categorical topics (e.g., parenting, small business ownership, high-income products, gaming, alcohol (spirits), gambling, sports, retired living, quantity of posted pictures, quantity of received and/or sent messages, etc.). In other examples, the data interface 102 may access a configuration file indicative of the demographic data type and the behavioral data type to use.

The data interface 102 selects a portion of the self-reported demographics 118 and the behavioral data 120 corresponding to the demographics data type(s) and behavioral data type(s) selected at block 810. The data interface 102 generates the panelist-user data 126 (FIG. 1) (block 814). In the illustrated examples, the panelist-user data 126 includes demographic data from the reference demographics 112 and the self-reported demographics 118 of FIG. 1 based on the demographic data type(s) selected at block 810 and includes behavioral data from the behavioral data 120 of FIG. 1 based on the behavioral data type(s) selected at block 810.

The modeler 104 generates the training models 128 based on different portions (e.g., different 80% subsets) of the panelist-user data 126 (block 816). In the illustrated example, the modeler 104 generates one-hundred training models 128 (or more or fewer), and each training model 128 is based on a different 80% of the of the panelist-user data 126.

Each training model 128 is then runs each training model 128 to generate the output results 130 (block 818). In the illustrated example, the output results 130 are generated by applying each training model 128 to a respective 80% subset of the panelist-user data 126 used to generate it and the corresponding 20% subset of the panelist-user data 126 that was not used to generate it. The analyzer 106 evaluates the training models 128 based on the output results 130 as discussed above (block 820). For example, the analyzer 106 evaluates the training models 128 to identify ones of the training models 128 that (1) have acceptable performance based on the AME-to-DBP age bucket comparisons of the within-model evaluation and (2) include the same behavioral variables. Based on the evaluations of the different training models, the analyzer 106 selects a training model (block 822). In the illustrated example, the analyzer 106 selects one of the training models 128 based on it having the least variance (e.g., relatively most stable and accurate).

The analyzer 106 determines whether adjustments should be made to any of the demographic categories (block 824). In the illustrated example, the demographic categories are the age buckets of the AME age category table 600 of FIG. 6, and the analyzer 106 is to determine that adjustments to age assignments only in cases where there is sufficient confidence that the bias being corrected for is statistically significant. Without such confidence that an uncorrected bias is statistically significant, there is a potential risk of over-zealous adjustments that could skew age distributions when applied to a wider registered user population of the database proprietor 124. To avoid making such overzealous adjustments, the analyzer 106 uses two criteria to determine what action to take (e.g., whether to adjust an age or not to adjust an age) based on a two-stage process: (a) check data accuracy and model stability first, then (b) reassign to another age category only if accuracy will be improved and the model is stable, otherwise leave data unchanged. That is, to determine which demographic categories (e.g., age categories shown in an AME age category table 600 of FIG. 6) to adjust, the analyzer 106 performs the AME-to-DBP age bucket comparisons and identifies categories to adjust based on a threshold. For example, if the AME demographics indicate that there are 30 people within a particular age bucket and less than a desired quantity of DBP users match the age range of the same bucket, the analyzer 106 determines that the value of the demographic category for that age range should be adjusted. Based on such analyses, the analyzer 106 can inform the adjuster 108 of which demographic categories to adjust.

If the analyzer 106 determines at block 824 that one or more demographic categories should be adjusted, the adjuster 108 adjusts the one or more demographic categories indicated by the analyzer 106 (block 826). In the illustrated example, the adjuster 108 performs the adjustment(s) by redistributing values among the demographic categories (e.g., age buckets). The redistribution of the values forms new coefficients of the modified coefficient matrix (e.g., values in the A-M columns 710 of FIG. 7) for use as correction factors when the adjustment model 132 is delivered and used by the database proprietor 124 on other user data (e.g., the media impressions-based self-reported demographics 302 and behavioral data 304 of FIG. 3). After making adjustments at block 826 or if no adjustments are made, the adjustment model 132 is finalized and provided to the database proprietor 124 (block 828).

After providing the adjustment model 132 to the database proprietor 124, control advances to block 830 of FIG. 8B. In the illustrated example, the operations of FIG. 8B are described with reference to FIG. 3. The adjustment model 132 obtains the media impression-based self-reported demographics data 302 and behavioral data 304 of FIG. 3 (block 830) from the user account database 122 of FIG. 1. The adjustment model 132 selects a demographic data type and a behavioral data type (block 832) for the analysis of the media impression-based self-reported demographics data 302 and behavioral data 304. The adjustment model 132 organizes the media impression-based self-reported demographics data 302 into buckets (e.g., the AME age groups of the AME age category table 600 of FIG. 6) (block 834).

The adjustment model 132 is applied to the bucket-organized media impression-based self-reported demographics data 302 and the behavioral data 304 (block 836). In the illustrated example, the adjustment model 132 stores the resulting output data of running the adjustment model 132 into a data structure such as the terminal node table 700 of FIG. 7 for each leaf node of a decision tree associated with the adjustment model 132.

The adjustment model 132 determines whether to adjust demographic data in any bucket (block 838). In the illustrated example, the adjustment model 132 determines whether to adjust demographic data by analyzing the data of the decision tree leaf nodes from, for example, the terminal node table 700. If the adjustment model 132 determines at block 838 that it should adjust demographic data in one or more buckets (e.g., one or more of the AME age groups of the AME age category table 600 of FIG. 6), the adjustment model 132 performs a statistical analysis for the indicated one or more bucket(s) (block 840). In the illustrated example, the adjustment model 132 performs the statistical analysis using a Bayesian analysis of the demographic data in the one or more bucket(s) relative to corresponding demographic data in the reference demographics 112 (e.g., demographic data in the reference demographics 112 falling into the same ranges of the one or more buckets to be adjusted). In this manner, the adjustment model 132 can select adjustment amounts based on the Bayesian analysis that will not introduce bias or inaccuracies to other buckets of the demographic data.

The adjustment model 132 adjusts the media impression-based self-reported demographic data 302 for the indicated one or more bucket(s) based on the statistical analysis (block 842) to generate the adjusted general-user demographics 306. The database proprietor 124 then determines whether to analyze another demographic data type (block 844). For example, the adjustment model 132 may be configured to receive user input on which demographic data types to analyze and/or may be configured to access a configuration file or data structure indicating demographic data types for which to perform adjustment analyses. If the database proprietor 124 determines at block 844 that it should analyze another demographic data type, control returns to block 832. Otherwise, control advances to block 846.

At block 846, the database proprietor 124 determines whether to analyze other media impression-based demographic data (block 846). For example, the adjustment model 132 may receive other media impression-based demographic data to analyze in addition to the media impression-based demographic data 302. For example, in some instances, the adjustment model 132 may be configured to continuously process any new media based-impression demographic data and/or to process any new media based-impression demographic data collected within the last 24 hours or other duration. If the database proprietor 124 determines at block 846 that it should analyze other media impression-based demographic data, control returns to block 830. Otherwise, the example processes of FIGS. 8A and 8B end.

Figure 9:
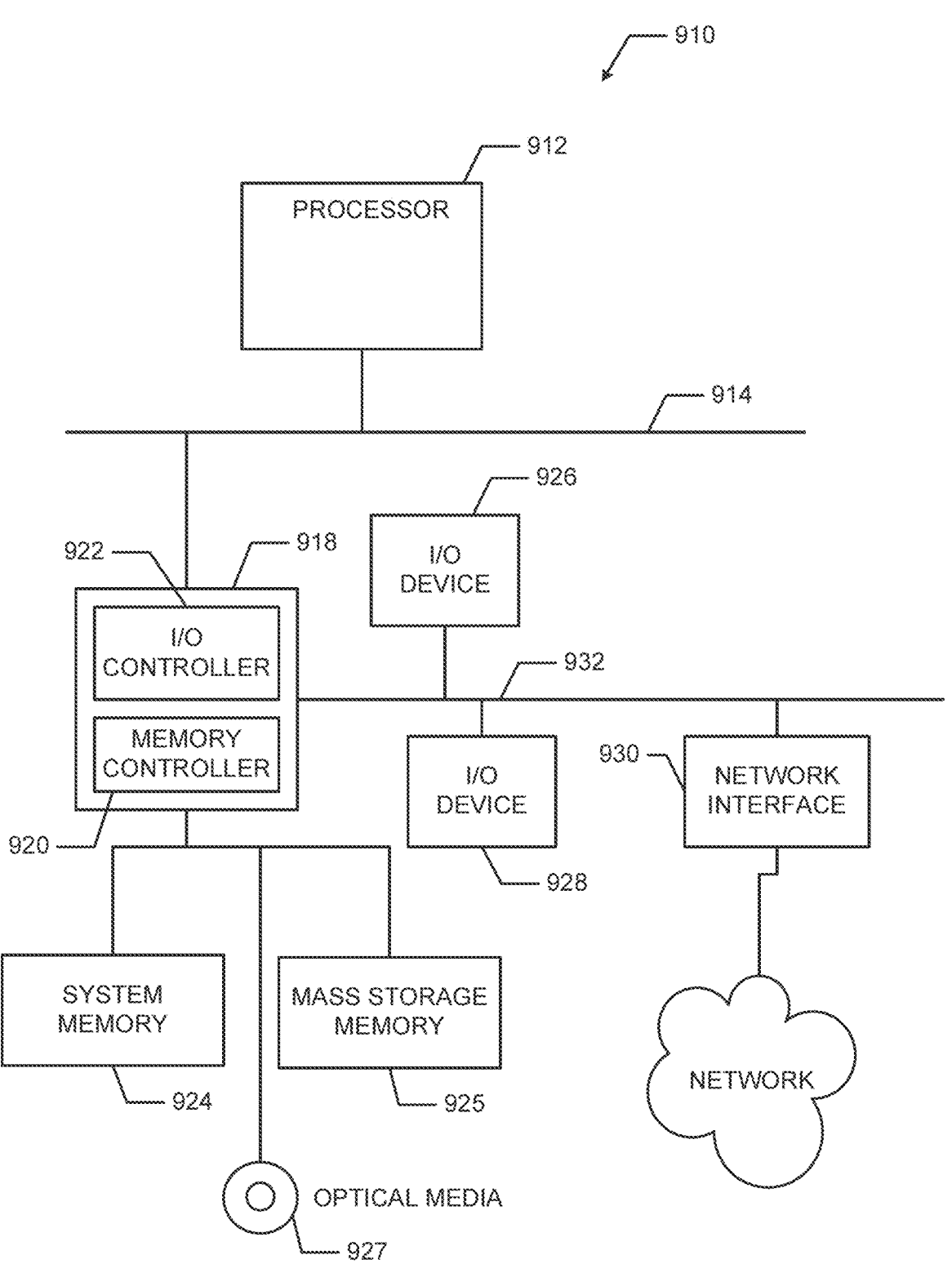
FIG. 9 illustrates an example processor system that may be used to execute the example instructions of FIGS. 8A and 8B to implement the example apparatus of FIG. 1.

FIG. 9 is an example processor system that can be used to execute the example instructions of FIGS. 8A and 8B to implement the example apparatus 100 of FIG. 1. As shown in FIG. 9, the processor system 910 includes a processor 912 that is coupled to an interconnection bus 914. The processor 912 may be any suitable processor, processing unit, or microprocessor. Although not shown in FIG. 9, the system 910 may be a multi-processor system and, thus, may include one or more additional processors that are identical or similar to the processor 912 and that are communicatively coupled to the interconnection bus 914.

The processor 912 of FIG. 9 is coupled to a chipset 918, which includes a memory controller 920 and an input/output (I/O) controller 922. A chipset provides I/O and memory management functions as well as a plurality of general purpose and/or special purpose registers, timers, etc. that are accessible or used by one or more processors coupled to the chipset 918. The memory controller 920 performs functions that enable the processor 912 (or processors if there are multiple processors) to access a system memory 924, a mass storage memory 925, and/or an optical media 927.

In general, the system memory 924 may include any desired type of volatile and/or non-volatile memory such as, for example, static random access memory (SRAM), dynamic random access memory (DRAM), flash memory, read-only memory (ROM), etc. The mass storage memory 925 may include any desired type of mass storage device including hard disk drives, optical drives, tape storage devices, etc. The optical media 927 may include any desired type of optical media such as a digital versatile disc (DVD), a compact disc (CD), or a blu-ray optical disc.

The I/O controller 922 performs functions that enable the processor 912 to communicate with peripheral input/output (I/O) devices 926 and 928 and a network interface 930 via an I/O bus 932. The I/O devices 926 and 928 may be any desired type of I/O device such as, for example, a keyboard, a video display or monitor, a mouse, etc. The network interface 930 may be, for example, an Ethernet device, an asynchronous transfer mode (ATM) device, an 802.11 device, a digital subscriber line (DSL) modem, a cable modem, a cellular modem, etc. that enables the processor system 910 to communicate with another processor system.

While the memory controller 920 and the I/O controller 922 are depicted in FIG. 9 as separate functional blocks within the chipset 918, the functions performed by these blocks may be integrated within a single semiconductor circuit or may be implemented using two or more separate integrated circuits.

Figure 10:
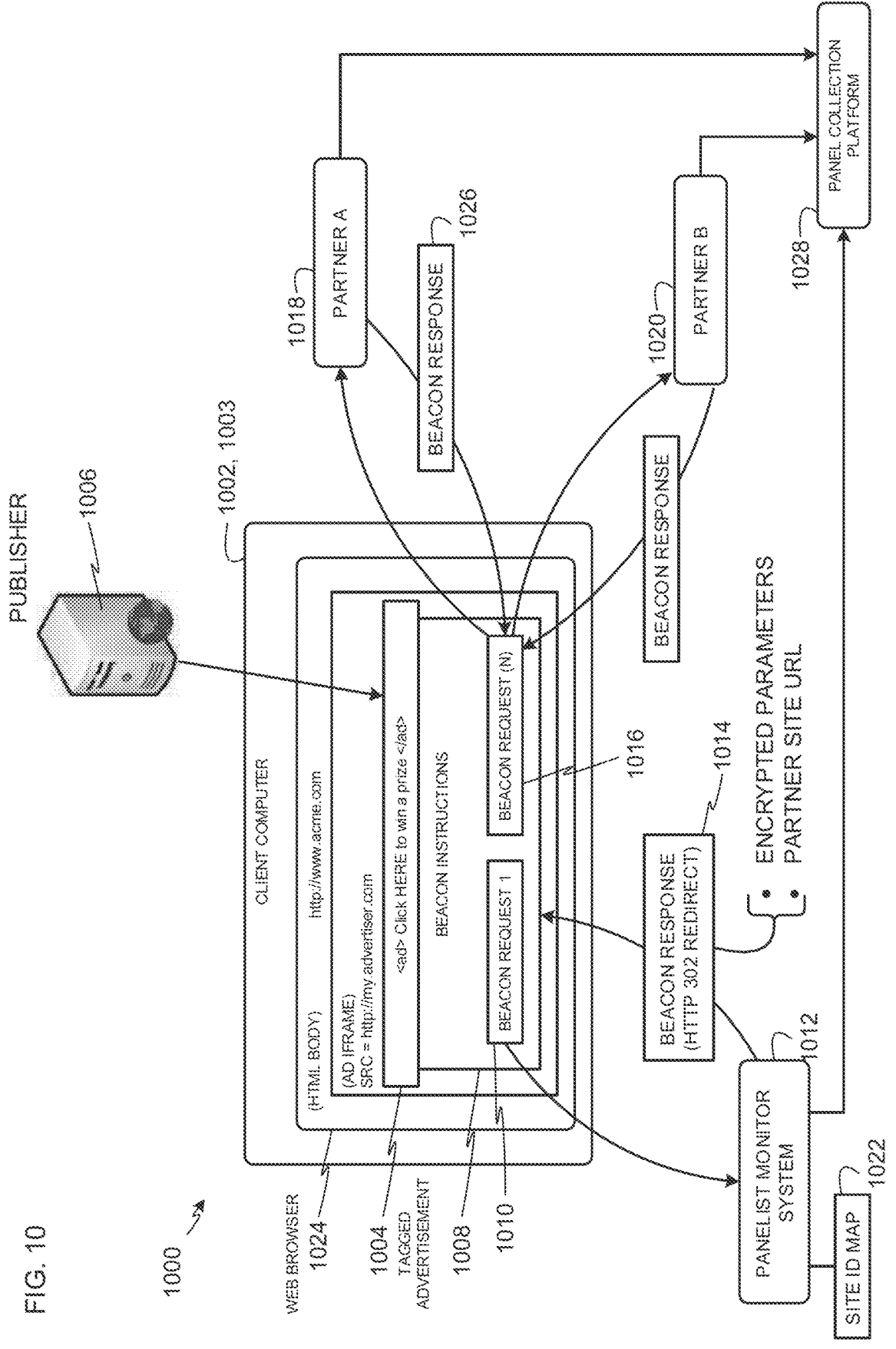
FIG. 10 is a communication flow diagram of an example manner in which a web browser can report ad impressions to servers having access to demographic information for a user of that web browser.

Turning to FIG. 10, an example communication flow diagram shows an example manner in which an example system 1000 logs ad impressions by clients (e.g., clients 1002, 1003). The example chain of events shown in FIG. 10 occurs when a client 1002, 1003 accesses a tagged advertisement of the content. Thus, the events of FIG. 10 begin when a client sends an HTTP request to a server for content, which, in this example, is tagged to forward an exposure request to the ratings entity. In the illustrated example of FIG. 10, a web browser 1024 of the client 1002, 1003 receives the requested content (e.g., an advertisement 1004) from an ad publisher 1006. It is to be understood that the client 1002, 1003 often requests a webpage containing content of interest (e.g., www.weather.com) and the requested webpage contains links to ads that are downloaded and rendered in predefined locations in the webpage. The ads may come from different servers than the requested content. Thus, the requested content may contain instructions that cause the client 1002, 1003 to request the ads (e.g., from an ad publisher 1006) as part of the process of rendering the webpage originally requested by the client. Either the webpage, the ad, or both may be tagged. In the illustrated example, the uniform resource locator (URL) of the ad publisher is illustratively named http://my.advertiser. com.

The advertisement 1004 is tagged with the beacon instructions 1008. Initially, the beacon instructions 1008 cause the web browser 1024 of the client 1002 or 1003 to send a beacon request 1010 to a panelist monitor system 1012 (e.g., of the AME 116 of FIG. 1) when the ad 1004 is displayed. In the illustrated example, the web browser 1024 sends the beacon request 1010 using an HTTP request addressed to the URL of the panelist monitor system 1012 (e.g., to a server of the panelist monitor system 1012). The beacon request 1010 includes one or more of a campaign ID, a creative type ID, and/or a placement ID associated with the advertisement 1004. In addition, the beacon request 1010 includes a document referrer (e.g., www.acme.com), a timestamp of the ad impression, and a publisher site ID (e.g., the URL http://my.advertiser.com of the ad publisher 1006). In addition, if the web browser 1024 of the client 1002 or 1003 contains a panelist monitor cookie, the beacon request 1010 will include the panelist monitor cookie. In other example implementations, the cookie may not be passed until the client 1002 or 1003 receives a request sent by a server of the panelist monitor system 1012 in response to, for example, the panelist monitor system 1012 receiving the beacon request 1010.

In response to receiving the beacon request 1010, the panelist monitor system 1012 logs an ad impression by recording the ad identification information (and any other relevant identification information) contained in the beacon request 1010. In the illustrated example, the panelist monitor system 1012 logs the impression regardless of whether the beacon request 1010 indicated a user ID that matched a user ID of a panelist member. However, if the user ID (e.g., the panelist monitor cookie) matches a user ID of a panelist member set by and, thus, stored in the record of the ratings entity subsystem (e.g., the AME 116 of FIG. 1), the logged ad impression will correspond to a panelist of the panelist monitor system 1012. If the user ID does not correspond to a panelist of the panelist monitor system 1012, the panelist monitor system 1012 will still benefit from logging an ad impression even though it will not have a user ID record (and, thus, corresponding demographics) for the ad impression reflected in the beacon request 1010.

To compare panelist demographics (e.g., for accuracy or completeness) of the panelist monitor system 1012 with demographics at partner sites and/or to enable a partner site to attempt to identify the client and log the impression, the panelist monitor system 1012 returns a beacon response message 1014 to the web browser 1024 of the client 1002, 1003 including an HTTP 302 redirect and a URL of a participating partner. The HTTP 302 redirect instructs the web browser 1024 of the client 1002, 1003 to send a second beacon request 1016 to the particular partner (e.g., one of the partners A 1018 or B 1020 which may be the database proprietor 124 of FIGS. 1 and 3). In the illustrated example, the panelist monitor 1012 determines the partner specified in the beacon response 1014 using its rules/ML engine based on, for example, empirical data indicative of which partner should be preferred as being most likely to have demographic data for the user ID. In other examples, the same partner is always identified in the first redirect message and that partner always redirects the client 1002, 1003 to the same second partner when the first partner does not log the ad impression. In other words, a set hierarchy of partners is defined and followed such that the partners are "daisy chained" together in the same predetermined order rather than them trying to guess a most likely database proprietor to identify an unknown client 1003.

Prior to sending the beacon response 1014 to the web browser 1024 of the client 1002, 1003, the panelist monitor system 1012 replaces a site ID (e.g., a URL) of the ad publisher 1006 with a modified site ID discernable only by the panelist monitor system 1012 as corresponding to the ad publisher 1006. In some example implementations, the panelist monitor system 1012 may also replace the host website ID (e.g., www.acme.com) with another modified site ID discernable only by the panelist monitory system 1012 as corresponding to the host website. In this way, the source(s) of the ad and/or the host content are masked from the partners. In the illustrated example, the panelist monitor system 1012 maintains a publisher ID mapping table 1022 that maps original site IDs of ad publishers with modified site IDs created by the panelist monitor system 1012 to obfuscate or hide ad publisher identifiers from partner sites. In addition, the panelist monitor system 1012 encrypts all of the information received in the beacon request 1010 and the modified site ID to prevent any intercepting parties from decoding the information. The panelist monitor system 1012 sends the encrypted information in the beacon response 1014 to the web browser 1024. In the illustrated example, the panelist monitor system 1012 uses an encryption that can be decrypted by the selected partner site specified in the HTTP 302 redirect.

In response to receiving the beacon response 1014, the web browser 1024 of the client 1002, 1003 sends the beacon request 1016 to the specified partner site, which is the partner A 1018 (e.g., the database proprietor 124 of FIGS. 1 and 3) in the illustrated example. The beacon request 1016 includes the encrypted parameters from the beacon response 1014. The partner A 1018 (e.g., Facebook) decrypts the encrypted parameters and determines whether the client matches a registered user of services offered by the partner A 1018. This determination involves requesting the client

1002, 1003 to pass any cookie it stores that had been set by partner A 1018 and attempting to match the received cookie against the cookies stored in the records of partner A 1018. If a match is found, partner A 1018 has positively identified a list 1002, 1003. Accordingly, the partner A 1018 site logs an ad impression in association with the demographics information of the identified client. This log (which includes the undetectable source identifier) is subsequently provided to the ratings entity for processing into GRPs as discussed below. In the event partner A 1018 is unable to identify the client 1002, 1003 in its records (e.g., no matching cookie), the partner A 1018 does not log an ad impression.

In some example implementations, if the user ID does not match a registered user of the partner A 1018, the partner A 1018 may return a beacon response 1026 including a failure or non-match status or may not respond at all, thereby terminating the process of FIG. 10. However, in the illustrated example, if partner A 1018 cannot identify the client 1002, 1003, partner A 1018 returns a second HTTP 302 redirect message 1026 to the client 1002, 1003. For example, if the partner A 1018 site has logic (e.g., similar to the rules/ml engine) to specify another partner (e.g., partner B 1020 or any other partner) likely to have demographics for the user ID, then the beacon response 1026 may include an HTTP 302 redirect along with the URL of the other partner. Alternatively, in the daisy chain approach discussed above, the partner A 1018 site may always redirect to the same next partner (e.g., partner B 1020) whenever it cannot identify the client 1002, 1003. When redirecting, the partner A 1018 site of the illustrated example encrypts the ID, timestamp, referrer, etc. parameters using an encryption that can be decoded by the next specified partner.

As a further alternative, if the partner A site 1018 does not have logic to select a next best suited partner likely to have demographics for the user ID and is not daisy chained to a next partner, the beacon response 1026 can redirect the client 1002, 1003 to the panelist monitor system 1012 with a failure or non-match status. In this manner, the panelist monitor system 1012 can use its rules/ML engine to select a next-best suited partner to which the web browser of the client 1002, 1003 should send a beacon request (or, if no such logic is provided, simply select the next partner in a hierarchical (e.g., fixed) list). In the illustrated example, the panelist monitor system 1012 selects the partner B 1020 site, and the web browser 1024 of the client 1002, 1003 sends a beacon request to the partner B 1020 site with parameters encrypted in a manner that can be decrypted by the partner B 1020 site. The partner B 1020 site then attempts to identify the client 1002, 1003 based on its own internal database. If a cookie obtained from the client 1002, 1003 matches a cookie in the records of partner B 1020, partner B 1020 has positively identified the client 1002, 1003 and logs the ad impression in association with the demographics of the client 1002, 1003 for later provision to the panelist monitor system 1012. In the event that partner B 1020 cannot identify the client 1002, 1003, the same process of failure notification or further HTTP 302 redirects may be used by the partner B 1020 to provide a next other partner site an opportunity to identify the client and so on in a similar manner until a partner site identifies the client 1002, 1003 and logs the impression, until all partner sites have been exhausted without the client being identified, or until a predetermined number of partner sites failed to identify the client 1002, 1003.

Using the process illustrated in FIG. 10, ad impressions can be mapped to corresponding demographics even when the ad impressions are not triggered by panel members associated with the audience measurement entity 116 (e.g., ratings entity subsystem). That is, during an ad impression collection or merging process, the panel collection platform 1028 of the ratings entity can collect distributed ad impressions logged by (1) the panelist monitor system 1012 and (2) any particular participating partners (e.g., partners 1018, 1020). As a result, the collected data covers a larger population with richer demographics information than has heretofore been possible. Consequently, generating accurate, consistent, and meaningful online GRPs is possible by pooling the resources of the distributed databases as described above, the example structures of FIG. 10 generate online GRPs based on a large combined demographic databases distributed among unrelated parties. The end result appears as if users attributable to the logged ad impressions were part of a large virtual panel formed of registered users of the audience measurement entity because the selection of the participating partner sites can be tracked as if they were members of the audience measurement entities panels. This is accomplished without violating the cookie privacy protocols of the Internet.

Periodically or aperiodically, the ad impression data collected by the partners (e.g., partners 1018, 1020) is provided to the ratings entity (e.g., the AME 116) via a panel collection platform 1028. As discussed above, some user IDs may not match panel members of the panelist monitor system 1012, but may match registered users of one or more partner sites. During a data collecting and merging process to combine demographic and ad impression data from the ratings entity subsystem (e.g., the AME 116) and the partner subsystems (e.g., the database proprietor 124), user IDs of some ad impressions logged by one or more partners may match user IDs of ad impressions logged by the panelist monitor system 1012, while others (most likely many others) will not match. In some example implementations, the ratings entity subsystem (e.g., the AME 116) may use the demographics-based ad impressions from matching user ID logs provided by partner sites to assess and/or improve the accuracy of its own demographic data, if necessary. For the demographics-based ad impressions associated with non-matching user ID logs, the ratings entity subsystem (e.g., the AME 116) may use the ad impressions to derive demographics-based online GRPs even though such ad impressions are not associated with panelists of the ratings entity subsystem.

Figure 11:
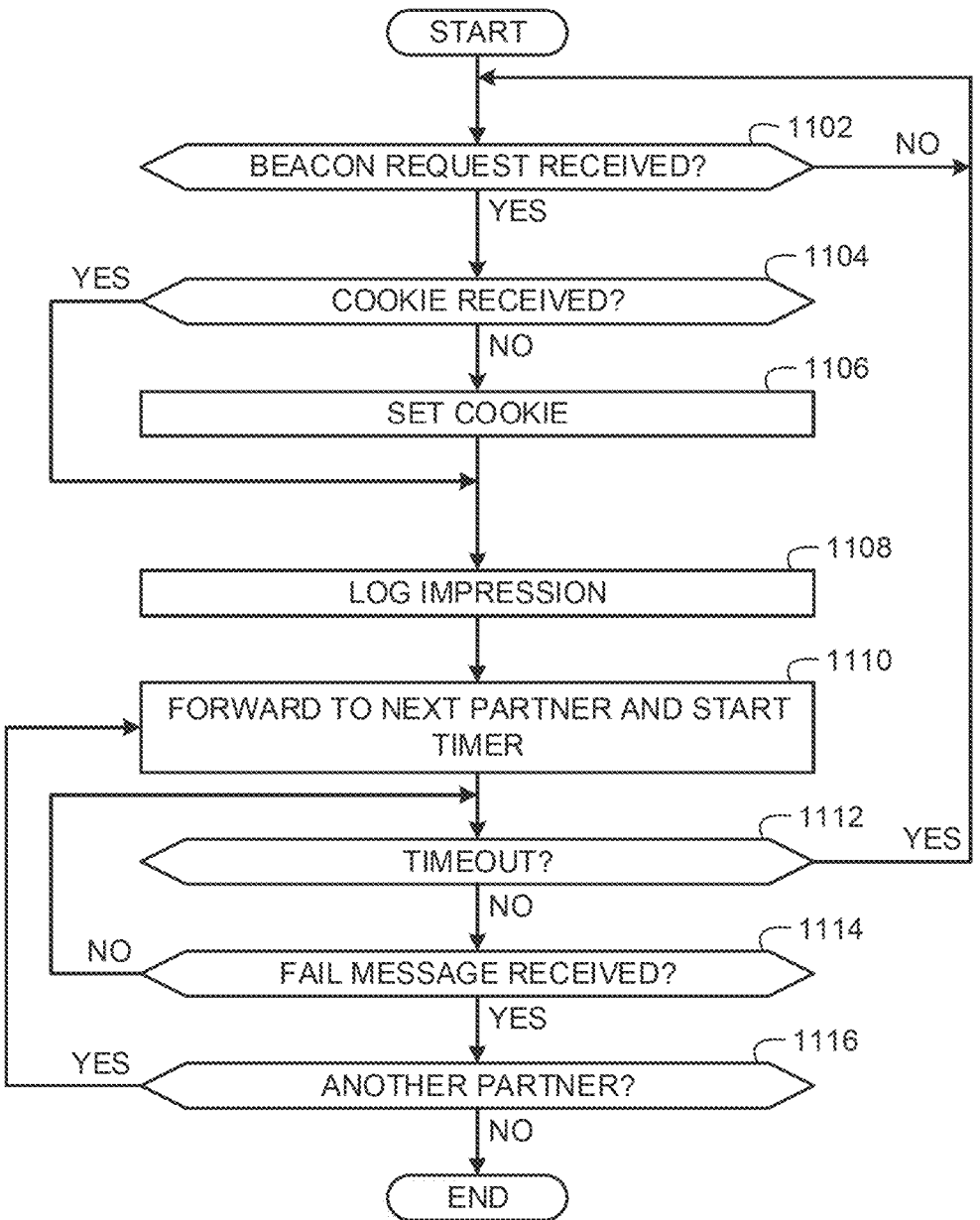
FIG. 11 is a flow diagram representative of example machine readable instructions that may be executed by a panelist monitoring system to log demographics-based advertisement impressions and/or redirect beacon requests to web service providers to log demographics-based advertisement impressions.

Turning to FIG. 11, the example flow diagram may be performed by the panelist monitor system 1012 (FIG. 10) (e.g., of the AME 116) to log demographics-based advertisement impressions and/or redirect beacon requests to web service providers to log demographics-based advertisement impressions. Initially, the panelist monitor system 1012 waits until it has received a beacon request (e.g., the beacon request 1010 of FIG. 10) (block 1102). When the panelist monitor system 1012 receives a beacon request (block 1102), it determines whether a cookie (e.g., the panelist monitor cookie) was received from the client computer 1002, 1003 (block 1104). For example, if a panelist monitor cookie was previously set in the client computer 1002, 1003, the beacon request sent by the client computer 1002, 1003 to the panelist monitor system 1012 will include the cookie.

If the panelist monitor system 1012 determines at block 1104 that it did not receive the cookie in the beacon request (e.g., the cookie was not previously set in the client computer 1002, 1003, the panelist monitor system 1012 sets a cookie (e.g., the panelist monitor cookie) in the client computer 1002, 1003 (block 1106). For example, the panelist monitor system 1012 may send back a response to the client computer 1002, 1003 to 'set' a new cookie (e.g., the panelist monitor cookie).

After setting the cookie (block 1106) or if the panelist monitor system 1012 did receive the cookie in the beacon request (block 1104), the panelist monitor system 1012 logs an impression (block 1108). As discussed above, the panelist monitor system 1012 logs the impression regardless of whether the beacon request corresponds to a user ID that matches a user ID of a panelist member. However, if the user ID (e.g., the panelist monitor cookie) matches a user ID of a panelist member set by and, thus, stored in the record of the ratings entity subsystem (e.g., the AME 116), the logged ad impression will correspond to a panelist of the panelist monitor system 1012. If the user ID does not correspond to a panelist of the panelist monitor system 1012, the panelist monitor system 1012 will still benefit from logging an ad impression even though it will not have a user ID record (and, thus, corresponding demographics) for the ad impression reflected in the beacon request 1010.

The panelist monitor system 1012 sends a beacon response (e.g., the beacon response 1014) to the client computer 1002, 1003 including an HTTP 302 redirect to forward a beacon request (e.g., the beacon request 1016 of FIG. 10) to a next partner (e.g., the partner A 1018 of FIG. 10) and starts a timer (block 1110). In the illustrated example, the panelist monitor system 1012 will always send an HTTP 302 redirect at least once to allow at least another partner site to also log an ad impression for the same advertisement (or content). However, in other example implementations, the panelist monitor system 1012 may include rules (e.g., as part of the rules/ML engine) to exclude some beacon requests from being redirected. The timer set at block 1110 is used to wait for a fail status message from the next partner indicating that the next partner did not find a match for the client computer 1002, 1003 in its records.

If the timeout has not expired (block 1112), the panelist monitor system 1012 determines whether it has received a fail status message (block 1114). Control remains at blocks 1112 and 1114 until either (1) a timeout has expired, in which case control returns to block 1102 to receive another beacon request or (2) the panelist monitor system 1012 receives a fail status message.

If the panelist monitor system 1012 receives a fail status message (block 1114), the panelist monitor system 1012 determines whether there is another partner to which a beacon request should be sent (block 1116) to provide another opportunity to log an impression. The panelist monitor system 1012 may select a next partner based on a smart selection process using the rules/ML engine or based on a fixed hierarchy of partners. If the panelist monitor system 1012 determines that there is another partner to which a beacon request should be sent, control returns to block 1110. Otherwise, the example process of FIG. 11 ends.

Although the above discloses example methods, apparatus, systems, and articles of manufacture including, among other components, firmware and/or software executed on hardware, it should be noted that such methods, apparatus, systems, and articles of manufacture are merely illustrative and should not be considered as limiting. For example, it is contemplated that any or all of these hardware, firmware, and/or software components could be embodied exclusively in hardware, exclusively in firmware, exclusively in software, or in any combination of hardware, firmware, and/or software. Accordingly, while the above describes example methods, apparatus, systems, and articles of manufacture, the examples provided are not the only ways to implement such methods, apparatus, systems, and articles of manufacture. Thus, although certain example methods, apparatus, systems, and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A system comprising:

a processor; and memory having stored thereon machine-readable instructions that, when executed by the processor, cause performance of a set of operations comprising:

accessing, from a database, demographic data corresponding to user accounts for which computer-generated impression records are logged, wherein the user accounts are registered with a database proprietor and associated with client devices, wherein the computer-generated impression records are based on network communications received at a server of the database proprietor from the client devices and are indicative of the client devices accessing media via the Internet;

applying a demographic adjustment model to the demographic data, wherein the demographic adjustment model is configured to (i) identify one or more of the user accounts for which to adjust corresponding demographics of the demographic data and, (ii) based on a comparison of the corresponding demographics to reference demographics of panelists of an audience measurement entity, adjust the corresponding demographics to generate adjusted user demographic data; and assigning the adjusted user demographic data to corresponding computer-generated impression records logged for the one or more of the user accounts.

2. The system of claim 1, wherein the database is a database of the database proprietor.

3. The system of claim 1, wherein the demographics data comprises self-reported demographics data.

4. The system of claim 1, wherein the comparison of the corresponding self-reported demographics to the reference demographics of the panelists of the audience measurement entity comprises a comparison of the corresponding self-reported demographics to a probability distribution of the reference demographics of the panelists.

5. The system of claim 1, the set of operations further comprising:

generating the demographic adjustment model based at least in part on the reference demographics.

6. The system of claim 1, wherein assigning the adjusted user demographic data to the corresponding computer-generated impression records logged for the one or more of the user accounts corrects inaccuracies in user ages of the demographic data.

7. The system of claim 1, wherein the system comprises a database proprietor computing system of the database proprietor, separate from an audience measurement computing system of the audience measurement entity.

8. The system of claim 7, the set of operations further comprising:

receiving the demographic adjustment model from the audience measurement computing system, wherein the audience measurement computing system is configured to generate the demographic adjustment model based at least in part on the reference demographics.

9. A non-transitory computer-readable storage medium, having stored thereon machine-readable instructions that, when executed by a processor, cause performance of a set of operations comprising:

accessing, from a database, demographic data corresponding to user accounts for which computer-generated impression records are logged, wherein the user accounts are registered with a database proprietor and associated with client devices, wherein the computer-generated impression records are based on network communications received at a server of the database proprietor from the client devices and are indicative of the client devices accessing media via the Internet;

applying a demographic adjustment model to the demographic data, wherein the demographic adjustment model is configured to (i) identify one or more of the user accounts for which to adjust corresponding demographics of the demographic data and, (ii) based on a comparison of the corresponding demographics to reference demographics of panelists of an audience measurement entity, adjust the corresponding demographics to generate adjusted user demographic data; and assigning the adjusted user demographic data to corresponding computer-generated impression records logged for the one or more of the user accounts.

10. The non-transitory computer-readable storage medium of claim 9, wherein the database is a database of the database proprietor.

11. The non-transitory computer-readable storage medium of claim 9, wherein the comparison of the corresponding self-reported demographics to the reference demographics of the panelists of the audience measurement entity comprises a comparison of the corresponding self-reported demographics to a probability distribution of the reference demographics of the panelists.

12. The non-transitory computer-readable storage medium of claim 9, the set of operations further comprising:

generating the demographic adjustment model based at least in part on the reference demographics.

13. The non-transitory computer-readable storage medium of claim 9, wherein assigning the adjusted user demographic data to the corresponding computer-generated impression records logged for the one or more of the user accounts corrects inaccuracies in user ages of the demographic data.

14. The non-transitory computer-readable storage medium of claim 9, the set of operations further comprising:

receiving the demographic adjustment model from an audience measurement computing system, wherein the audience measurement computing system is configured to generate the demographic adjustment model based at least in part on the reference demographics.

15. A method comprising:

accessing, from a database, demographic data corresponding to user accounts for which computer-generated impression records are logged, wherein the user accounts are registered with a database proprietor and associated with client devices, wherein the computer-generated impression records are based on network communications received at a server of the database proprietor from the client devices and are indicative of the client devices accessing media via the Internet;

applying a demographic adjustment model to the demographic data, wherein the demographic adjustment model is configured to (i) identify one or more of the user accounts for which to adjust corresponding demographics of the demographic data and, (ii) based on a comparison of the corresponding demographics to reference demographics of panelists of an audience measurement entity, adjust the corresponding demographics to generate adjusted user demographic data; and assigning the adjusted user demographic data to corresponding computer-generated impression records logged for the one or more of the user accounts.

16. The method of claim 15, wherein the database is a database of the database proprietor.

17. The method of claim 15, wherein the comparison of the corresponding self-reported demographics to the reference demographics of the panelists of the audience measurement entity comprises a comparison of the corresponding self-reported demographics to a probability distribution of the reference demographics of the panelists.

18. The method of claim 15, further comprising:

generating the demographic adjustment model based at least in part on the reference demographics.

19. The method of claim 15, wherein assigning the adjusted user demographic data to the corresponding computer-generated impression records logged for the one or more of the user accounts corrects inaccuracies in user ages of the demographic data.

20. The method of claim 15, further comprising:

receiving the demographic adjustment model from an audience measurement computing system, wherein the audience measurement computing system is configured to generate the demographic adjustment model based at least in part on the reference demographics.

* * * * *